United States Patent
Saito et al.

(10) Patent No.: US 8,108,669 B2
(45) Date of Patent: Jan. 31, 2012

(54) IMAGE FORMING APPARATUS FOR GENERATING ELECTRONIC SIGNATURE

(75) Inventors: Satoshi Saito, Kanagawa (JP); Yoichi Kanai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1158 days.

(21) Appl. No.: 11/484,073

(22) Filed: Jul. 10, 2006

(65) Prior Publication Data

US 2007/0016783 A1    Jan. 18, 2007

(30) Foreign Application Priority Data

Jul. 14, 2005   (JP) ................................ 2005-205792

(51) Int. Cl.
*H04L 9/32* (2006.01)
(52) U.S. Cl. ........ 713/156; 713/157; 713/158; 713/159; 713/175; 713/176; 726/10
(58) Field of Classification Search .......... 713/155–159, 713/173; 726/10
See application file for complete search history.

(56) References Cited

U.S. PATENT DOCUMENTS

| | | | | |
|---|---|---|---|---|
| 5,796,840 | A * | 8/1998 | Davis | 705/51 |
| 6,778,288 | B1 * | 8/2004 | Ogaki et al. | 358/1.15 |
| 2002/0116619 | A1 * | 8/2002 | Maruyama et al. | 713/176 |
| 2002/0129257 | A1 * | 9/2002 | Parmelee et al. | 713/180 |
| 2002/0174338 | A1 * | 11/2002 | Tomita et al. | 713/176 |
| 2004/0093493 | A1 * | 5/2004 | Bisbee et al. | 713/156 |
| 2005/0021969 | A1 * | 1/2005 | Williams et al. | 713/176 |
| 2005/0061871 | A1 * | 3/2005 | Yoshikawa et al. | 235/380 |
| 2006/0015716 | A1 * | 1/2006 | Thornton et al. | 713/155 |
| 2006/0020808 | A1 | 1/2006 | Yachida et al. | |
| 2006/0031923 | A1 | 2/2006 | Kanai | |

FOREIGN PATENT DOCUMENTS

| | | |
|---|---|---|
| JP | 2001-134181 | 5/2001 |
| JP | 2002-10044 | 1/2002 |
| JP | 2004-320308 | 11/2004 |
| JP | 3616601 | 11/2004 |
| JP | 2005-94703 | 4/2005 |
| JP | 2005-159726 | 6/2005 |
| JP | 2006-50210 | 2/2006 |

* cited by examiner

*Primary Examiner* — Taghi Arani
*Assistant Examiner* — Thaddeus Plecha
(74) *Attorney, Agent, or Firm* — Cooper & Dunham LLP

(57) ABSTRACT

An image forming apparatus for attaching an electronic signature to image data read from a paper document is disclosed. Validity of a first public key certificate that certifies a first signature key is determined. A first electronic signature-for the image data is generated by using the first signature key. The first electronic signature is prevented from being generated in response to an event that it is determined that the first public key certificate is invalid.

12 Claims, 20 Drawing Sheets

FIG.9

| SERIAL NUMBER OF CERTIFICATE | CERTIFICATE DATA | EXPIRATION DATE | VALIDATION PROOF INFORMATION |
|---|---|---|---|
| 04 A2 F0 | CERTIFICATE 1 | 2005/5/10 | CRL1 |
| 12 C9 B1 | CERTIFICATE 2 | 2005/5/12 | CRL2 |
| EB 24 87 | CERTIFICATE 3 | 2005/5/13 | OCSP RESPONSE 1 |
| 7F 21 D3 | CERTIFICATE 4 | 2007/12/31 | VERIFICATION CERTIFICATE(DVC) |

THE SIGNATURE KEY IN YOUR IC CARD IS INVALID.
PLEASE INSERT ANOTHER IC CARD INCLUDING A VALID SIGNATURE KEY.

CLOSE

AUTHENTICATION PATH

IMAGE FORMING APPARATUS FOR GENERATING ELECTRONIC SIGNATURE

BACKGROUND

1. Technical Field

This disclosure relates generally to image forming apparatuses, electronic signature generating methods, electronic signature generating program products, and recording media, and more particularly to an image forming apparatus, an electronic signature generating method, an electronic signature generating program product, and a recording medium for attaching an electronic signature to image data read from a paper document.

2. Description of the Related Art

The e-document law (electronic document law) has been established, which allows scanning a paper document required by law to be stored, and to store electronic data of the paper document. To indicate that the scan data is authentic, it is required to attach an electronic signature of the operator or the field supervisor that scanned the document, to the scan data.

A method of addressing such a requirement has been devised. Specifically, when scanning a paper document with a scanner or a digital multifunction machine, the operator inserts his IC card into a card reader fixed to the scanner. An electronic signature key stored in the IC card is used to compute an electronic signature specific to each user. The electronic signature is attached to the scan data when the document is scanned. According to this method, an electronic signature of the operator or the field supervisor can be easily attached to scan data (see, for example, Japanese Patent No. 3616601, and Japanese Laid-Open Patent Application No. 2002-10044).

However, if by any chance the electronic signature key stored in the IC card is invalid (for example, a public key certificate corresponding to the electronic signature key has expired, or has been revoked for some reason), and it is realized that the electronic signature key is invalid after the scanning operation, the scanning operation needs to be done over again.

The same problem arises in the medical field with an apparatus for generating medical image data, such as a CT scanner. To indicate that image data was surely taken with a specific CT scanner by a specific radiological technician, the radiological technician inserts his IC card into the CT scanner. When the medical image data is generated, an electronic signature is attached to the image data by the IC card.

BRIEF SUMMARY

In an aspect of this disclosure, there is provided an image forming apparatus, an electronic signature generating method, an electronic signature generating program product, and a recording medium that can prevent a useless operation of attaching an invalid electronic signature to image data.

In another aspect of this disclosure, there is provided an image forming apparatus for attaching an electronic signature to image data read from a paper document, including a first generating unit configured to generate a first electronic signature for the image data by using a first signature key certified by a first public key certificate; and a determining unit configured to determine validity of the first public key certificate, wherein the first generating unit is prevented from generating the first electronic signature in response to an event that the determining unit determines that the first public key certificate is invalid.

In another aspect of this disclosure, there is provided a method of attaching an electronic signature to image data read from a paper document in an image forming apparatus, the method including the steps of determining validity of a first public key certificate that certifies a first signature key; and generating a first electronic signature for the image data by using the first signature key, wherein the first electronic signature is prevented from being generated at the generating step in response to an event that the first public key certificate is determined as invalid at the determining step.

In another aspect of this disclosure, there is provided a program product that causes a computer to execute a procedure for attaching an electronic signature to image data read from a paper document in an image forming apparatus, the procedure including the steps of determining validity of a first public key certificate that certifies a first signature key; and generating a first electronic signature for the image data by using the first signature key, wherein the first electronic signature is prevented from being generated at the generating step in response to an event that the first public key certificate is determined as invalid at the determining step.

In another aspect of this disclosure, there is provided a computer-readable recording medium storing therein the above-mentioned program product. The above mentioned image forming apparatus, electronic signature generating method, electronic signature generating program product, and recording medium that can prevent a useless operation of attaching an invalid electronic signature to image data.

BRIEF DESCRIPTION OF THE DRAWINGS

Other objects, features and advantages of the present invention will become more apparent from the following detailed description when read in conjunction with the accompanying drawings, in which:

FIG. 9 is an example table of a validated certificate list;

FIG. 10 is an example screen message to prompt a user to insert another IC card;

DETAILED DESCRIPTION OF THE PREFERRED EMBODIMENTS

A description is given, with reference to the accompanying drawings, of an embodiment of the present invention.

Figure 1:
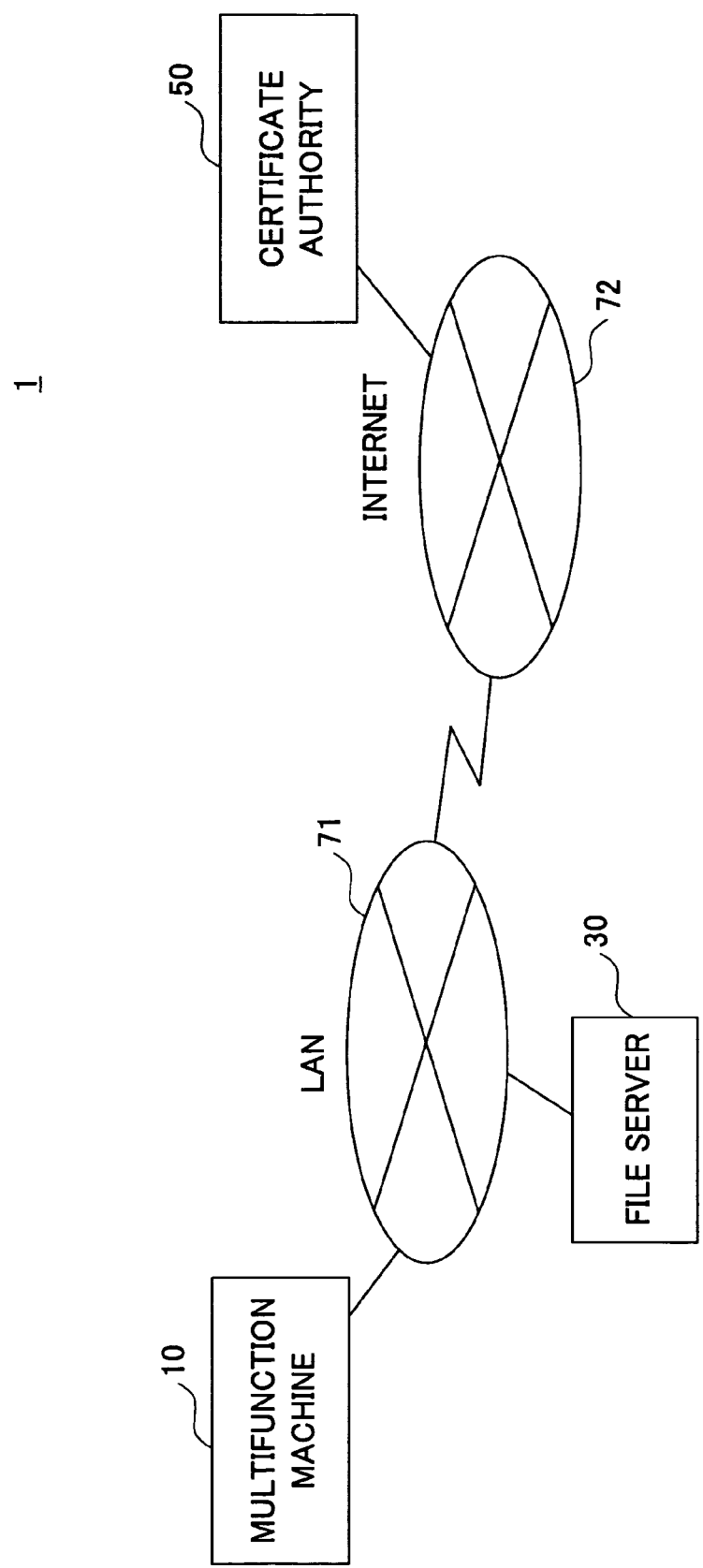
FIG. 1 is a schematic diagram of an image forming system according to an embodiment of the present invention.

FIG. 1 is a schematic diagram of a configuration of an image forming system 1 according to an embodiment of the present invention. The image forming system 1 includes a multifunction machine 10 and a file server 30 interconnected by a LAN (Local Area Network) 71, and a certificate authority (CA) 50 which is connected via the Internet 72.

The multifunction machine 10 is one example of an image forming apparatus in the present embodiment. The multifunction machine 10 is a digital multifunction machine with multiple functions, such as those of a scanner, a copier, a printer, and a facsimile machine, provided in a single chassis. The image forming apparatus is not limited to a multifunction machine, as long as it has a function of reading a paper document and generating image data. Thus, the image forming apparatus can be a mere scanner. The multifunction machine 10 according to the present embodiment has a function of providing an electronic signature in image data read from a paper document.

The file server 30 is a computer for accumulating and managing image data generated from a paper document by the multifunction machine 10.

The certificate authority 50 is a generally known certificate authority. In the multifunction machine 10 of the present embodiment, the certificate authority 50 issues a public key certificate of a secret key (signature key). The signature key is used for generating an electronic signature to be attached to image data. In the present embodiment, two types of electronic signatures to be attached to image data are used. One type is an electronic signature specific to the multifunction machine 10, which proves that the image data has been scanned with the multifunction machine 10 (hereinafter, "machine signature"). Another type is an electronic signature specific to a user, which proves that the image data has been scanned according to instructions given by a specific user (hereinafter, "user signature"). However, either type of electronic signature is sufficient for proving that image data has not been falsified. Thus, in the present embodiment, the multifunction machine 10 does not always attach both types of electronic signatures to image data, but attaches either type according to need.

Figure 2:
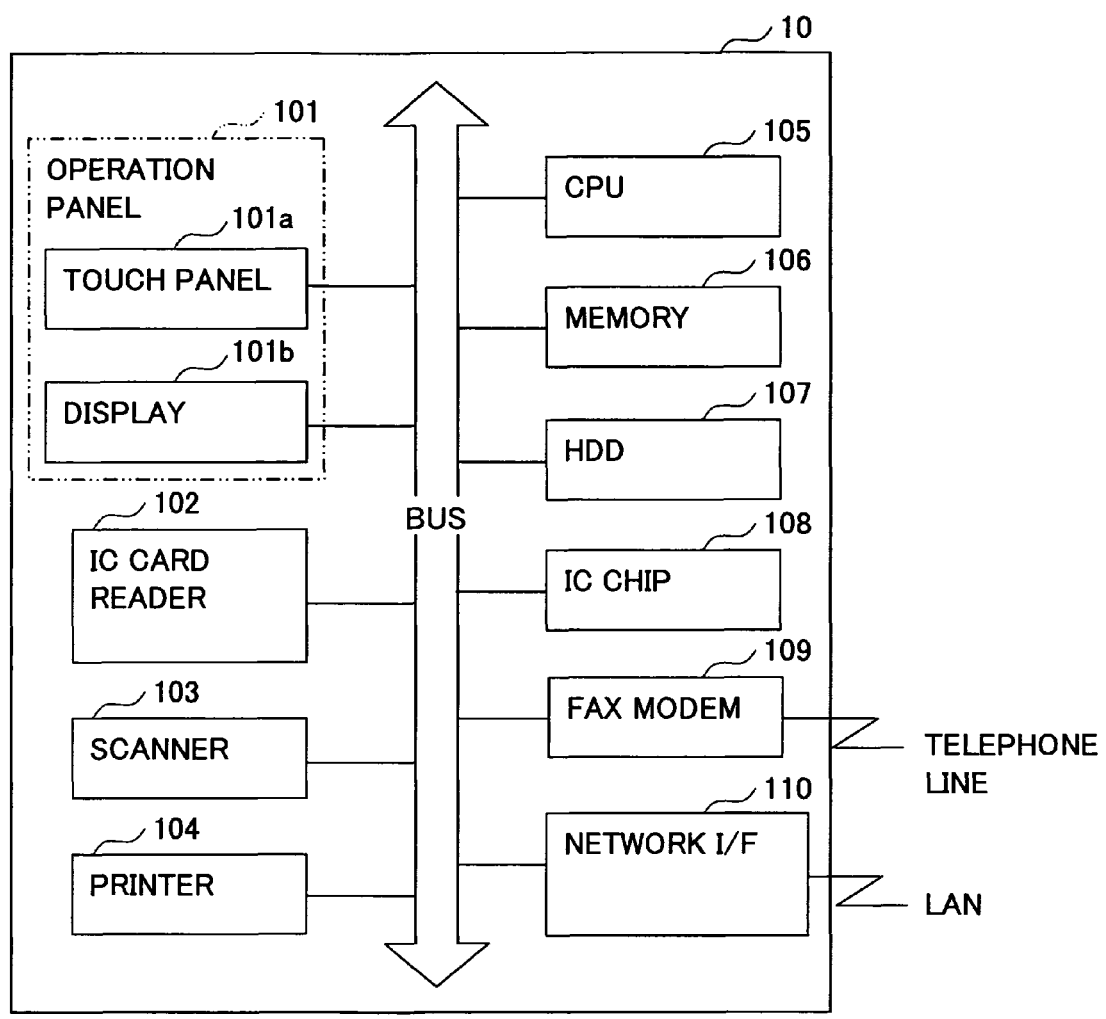
FIG. 2 is a block diagram of a hardware configuration of a multifunction machine according to the embodiment of the present invention.

FIG. 2 is a block diagram of a hardware configuration of the multifunction machine 10 according to the present embodiment. The multifunction machine 10 includes an operations panel 101 including a touch panel 101a and a display 101b, an IC card reader 102, a scanner 103, a printer 104, a CPU 105, a memory 106, an HDD (Hard Disk Drive) 107, an IC chip (HSM (Hardware Secure Module)) 108, a fax modem 109, and a network I/F 110. These components are interconnected by a bus.

The operations panel 101 serves as an interface with a user by receiving input from the user via the touch panel 101a, and providing various information items to the user via the display 101b.

The IC card reader 102 reads information from an IC card. In the present embodiment, a user of the multifunction machine 10 is required to insert an IC card, which is specific to the user, into the IC card reader 102, to receive authentication from the multifunction machine 10. In the present embodiment, an IC card specific to each user has a function of generating a user signature.

The scanner 103 reads an image from a paper document. The scanner 103 is used when sending a fax, taking a copy, or creating and saving electronic data of a paper document. The printer 104 prints out data received by fax, data of a copied document, or stored image data.

The CPU 105 executes various programs installed in the multifunction machine 10 to control the functions of the multifunction machine 10. The memory 106 is used as an area to save installed programs, and a memory space for performing operations when a program is executed. The HDD 107 stores installed programs, and saves image data scanned by the scanner 103.

The IC chip 108 generates a machine signature, safely saves the machine signature, and has computing capabilities of generating a machine signature. The fax modem 109 performs fax communication. The network I/F 110 is an interface for connecting the multifunction machine 10 to the LAN 71.

Figure 3:
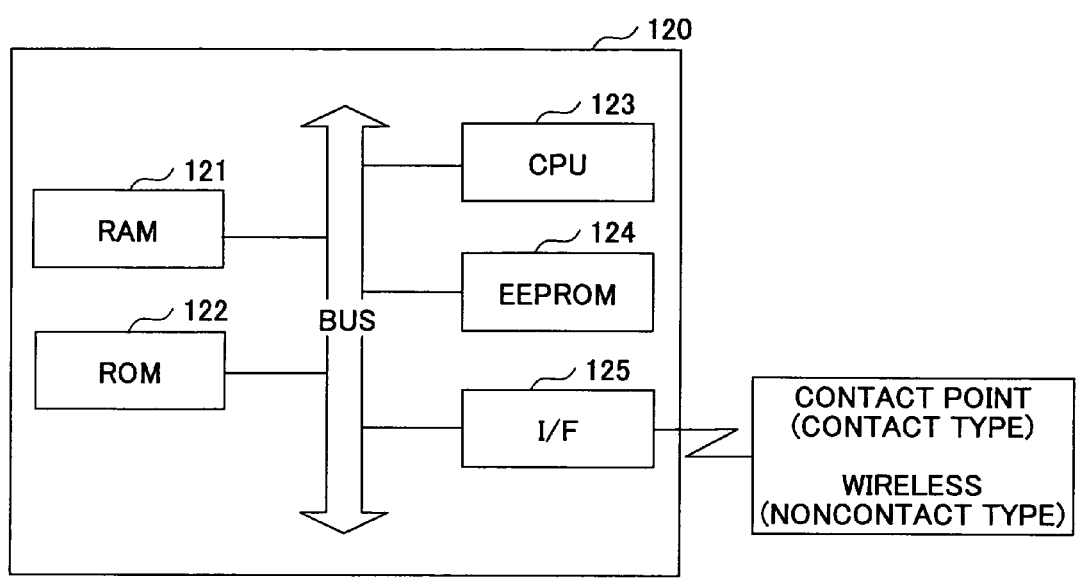
FIG. 3 is a block diagram of a hardware configuration of an IC card according to the embodiment of the present invention.

The following describes an IC card specific to its holder, which is distributed to each user in the present embodiment. FIG. 3 is a block diagram of a hardware configuration of an IC card 120 according the present embodiment. The IC card 120 includes a RAM 121, a ROM 122, a CPU 123, an EEPROM (Electrically Erasable Programmable Read-Only Memory) 124, and an I/F 125. These components are interconnected by a bus.

The RAM 121 is a volatile memory, and is used as a memory space for the CPU 123 for performing computations. The ROM 122 is a read-only memory, storing therein an OS (Operating System) of the IC card 120. The EEPROM 124 is a type of ROM, which is a non-volatile memory, but capable of being read and rewritten in byte units. The EEPROM 124 stores card applications and data, such as an application program for generating a user signature, a signature key for generating a user signature, and a public key certificate of a signature key. The I/F 125 serves as an interface with a card reader. The IC card 120 can be a contact type card or noncontact type card. The CPU 123 realizes various functions by executing the OS stored in the ROM 122 or an application stored in the EEPROM 124.

Figure 4:
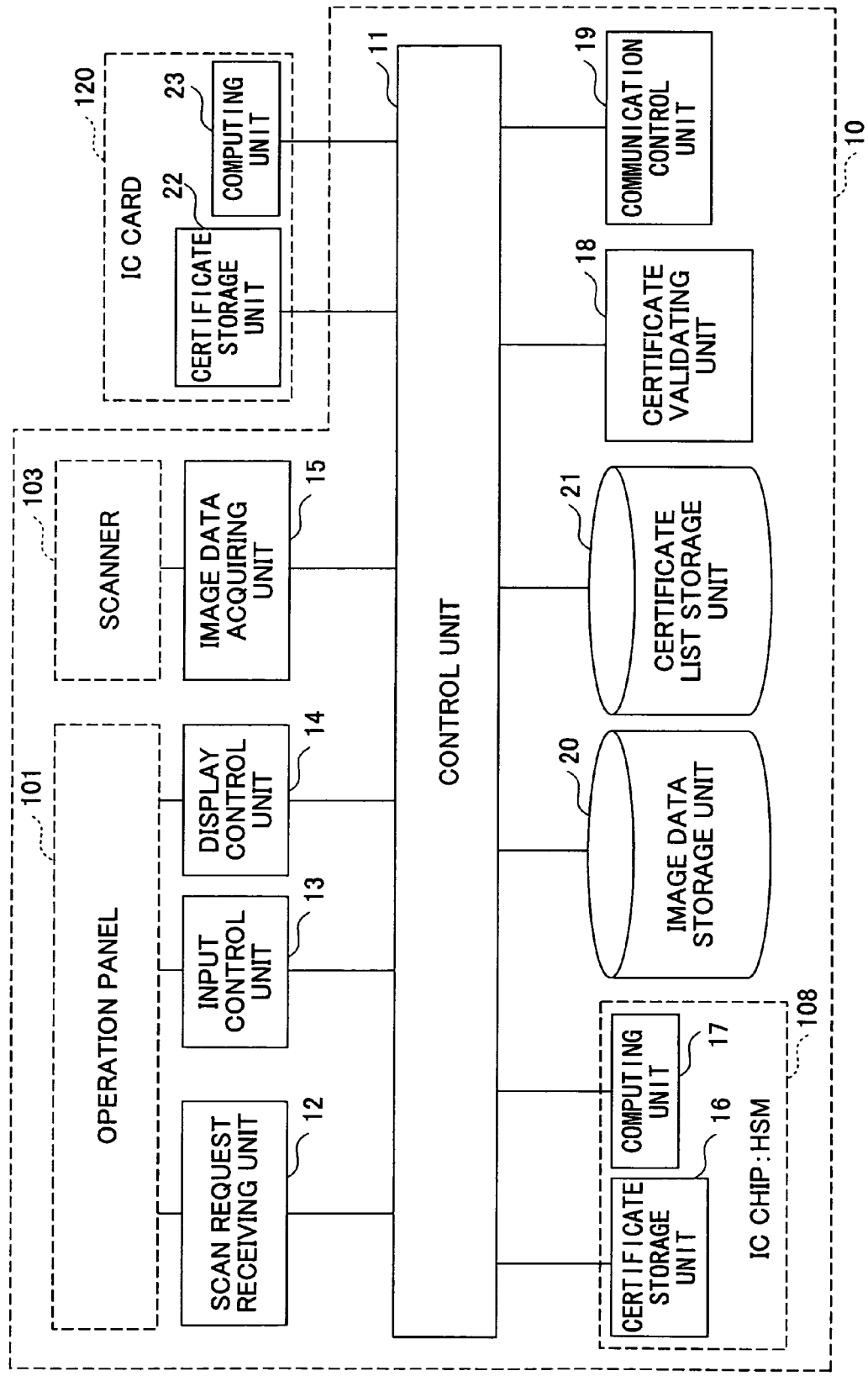
FIG. 4 is a block diagram of a functional configuration of the multifunction machine and the IC card according to the embodiment of the present invention.

Next, a functional configuration realized by executing programs in the multifunction machine 10 and programs in the IC card 120 is described. FIG. 4 is a block diagram of a functional configuration of the multifunction machine 10 and the IC card 120 according to the embodiment of the present invention.

As shown in FIG. 4, the multifunction machine 10 includes a control unit 11, a scan request receiving unit 12, an input control unit 13, a display control unit 14, an image data acquiring unit 15, a certificate storage unit 16, a computing unit 17, a certificate validating unit 18, a communication control unit 19, an image data storage unit 20, and a certificate list storage unit 21. The IC card 120 includes a certificate storage unit 22 and a computing unit 23. Functions of each unit will be described later with a process.

A process performed by the multifunction machine 10 is described below. In the present embodiment, the overall flow of the process (process summary) is described first, followed by a detailed description with reference to a flowchart.

Figure 5:
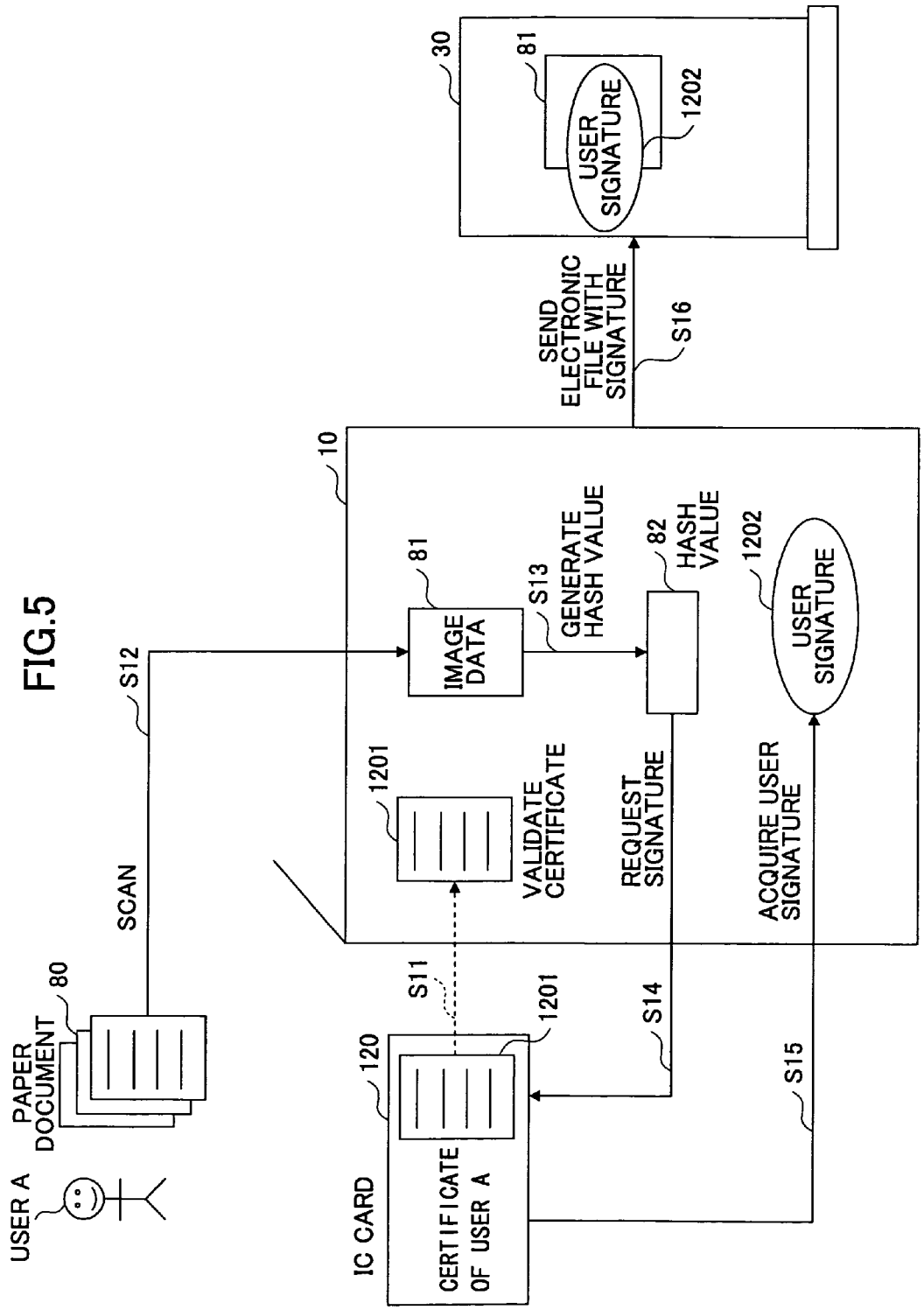
FIG. 5 is a schematic diagram for describing a process summary of a scanning operation performed by the multifunction machine.

FIG. 5 is a schematic diagram for describing a process summary of a scanning operation performed by the multifunction machine 10. FIG. 5 describes a process performed by the multifunction machine 10 when an instruction to scan a paper document 80 is received from a specific user (user A).

In response to a scan instruction from the user A, the multifunction machine 10 reads a public key certificate 1201 from the user A's IC card 120, and validates the public key certificate 1201 (step S11). Specifically, the public key certificate 1201 is validated by checking the authenticity, the validity period, and the revocation information of the public key certificate 1201.

The authenticity is checked by checking that a public key certificate has not been falsified. A public key certificate has attached an electronic signature provided by the certificate authority that issued the public key certificate. Based on the electronic signature, it can be checked as to whether the public key certificate has been falsified.

The validity period is checked by determining whether a public key certificate is within the validity period. An expiration date is recorded in a public key certificate. Accordingly, the multifunction machine 10 can determine whether the public key certificate is within the validity period by comparing a time and date indicated by an internal clock built in the multifunction machine 10, with the expiration date of the public key certificate.

The revocation information is checked by determining whether a public key certificate has been revoked by the certificate authority that issued the public key certificate. A public key certificate may be revoked by the certificate authority when a security problem arises. The certificate authority releases revocation information about a revoked public key certificate. Thus, the multifunction machine 10 can confirm whether the public key certificate 1201 has been revoked by querying the certificate authority 50 that issued the public key certificate 1201. An example of a security problem is when a signature key (a key which is to be safely stored and concealed from others) corresponding to a public key certificate is revealed to an outsider due to operational or technical problems.

When the validity of the public key certificate 1201 is confirmed, the multifunction machine 10 scans the paper document 80, and generates image data 81 (step S12). The multifunction machine 10 then generates a hash value 82 of the image data 81 (step S13), and sends the generated hash value 82 to the IC card 120, in order to request the IC card 120 to generate a user signature for the image data 81 (step S14). The IC card 120 encrypts the hash value 82 with a signature key to generate a user signature 1202, and outputs the generated user signature 1202 to the multifunction machine 10 (step S15). The multifunction machine 10 attaches the user signature 1202 to the image data 81, and sends the image data 81 to the file server 30 (step S16). Accordingly, image data with a user signature attached is accumulated in the file server 30.

In the process shown in FIG. 5, when the validity of the public key certificate 1201 is not confirmed, i.e., when the public key certificate 1201 is invalid, even if a signature key corresponding to the invalid public key certificate 1201 is used to generate an electronic signature (user signature), the electronic signature is not treated as valid. Accordingly, when the validity of the public key certificate 1201 is not confirmed, the multifunction machine 10 according to the present embodiment performs a process as shown in FIG. 6.

Figure 6:
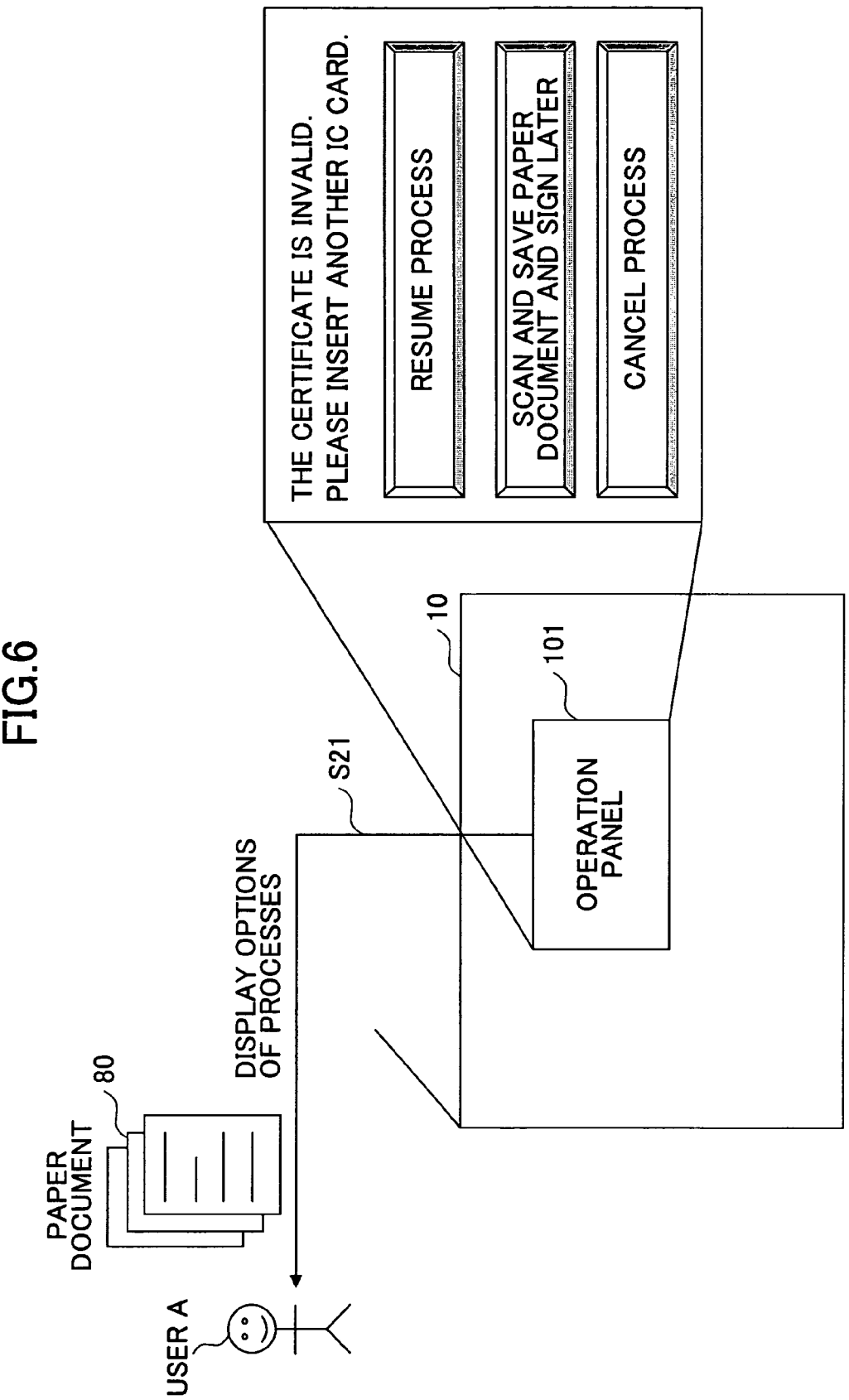
FIG. 6 is a schematic diagram for describing a process summary of the multifunction machine when validity of a public key certificate is not confirmed.

FIG. 6 is a schematic diagram for describing a process summary of the multifunction machine 10 when the validity of the public key certificate 1201 is not confirmed. The components common to those shown in FIG. 5 are denoted by common reference numerals, and overlapping descriptions are omitted.

When the validity of the public key certificate 1201 is not confirmed, the current IC card 120 does not generate a user signature. The multifunction machine 10 displays on the operations panel 101 a message that the public key certificate 1201 is invalid (step S21), and prompts the user A to select a subsequent process. Options of a subsequent process can be "resume process", "scan and save the paper document 80 and sign later", and "cancel process".

"Resume process" can be selected when the user A has ready another IC card 120 storing a valid public key certificate 1201. When this option is selected, the multifunction machine 10 confirms the validity of the valid public key certificate 1201 in another IC card 120. Subsequent processes are controlled according to a result of the confirmation.

"Cancel process" is selected when the user A decides to cancel the scanning for the time being.

"Scan and save the paper document 80 and sign later" (hereinafter, "image data saving process") is an option for when the user A does not have another IC card 120 storing a valid public key certificate 1201 ready. A process summary of the multifunction machine 10 when this option is selected is described with reference to FIG. 7.

Figure 7:
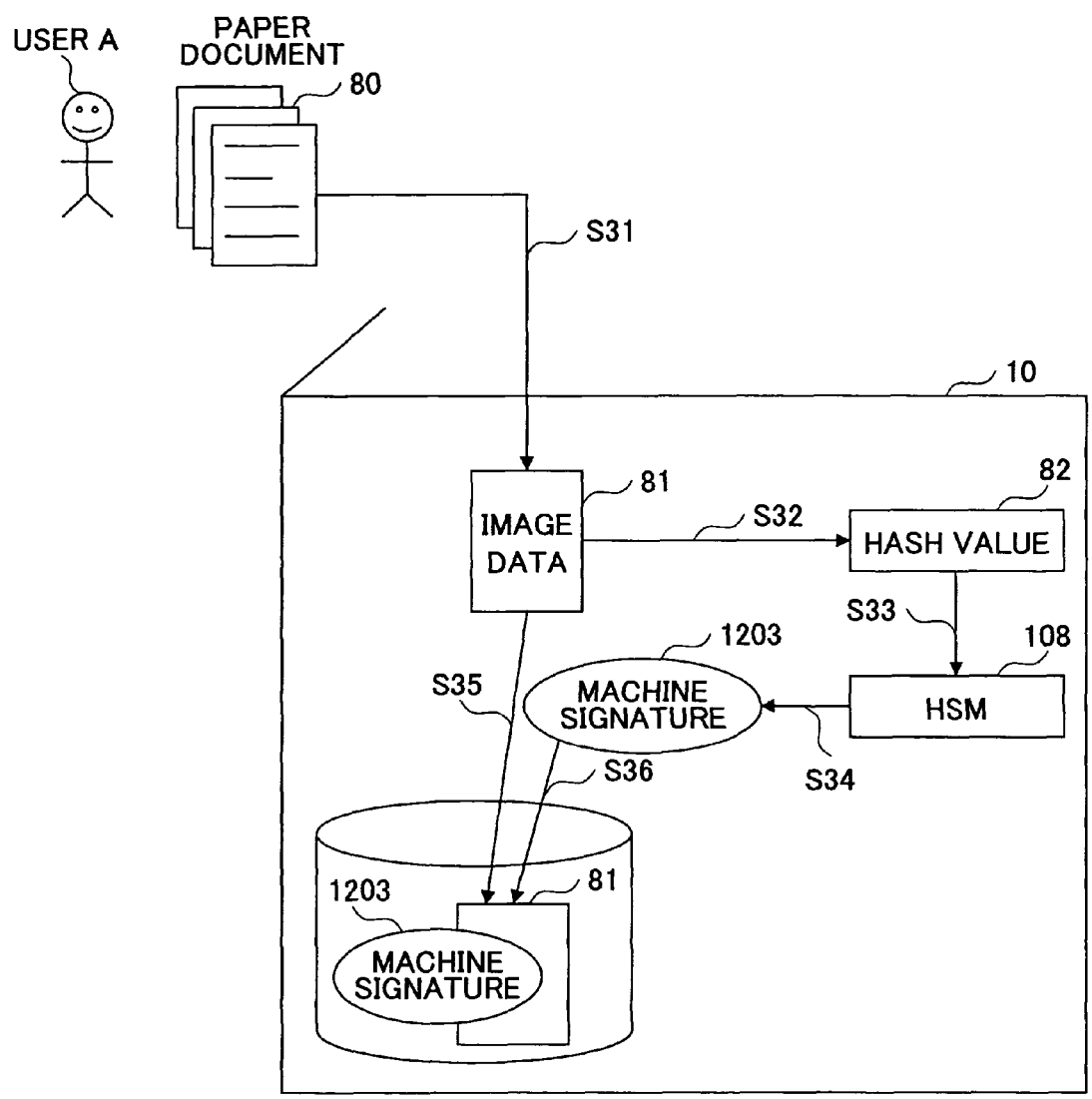
FIG. 7 is a schematic diagram for describing a process summary of an image data saving process.

FIG. 7 is a schematic diagram for describing a process summary of the image data saving process. The components common to those shown in FIG. 5 are denoted by common reference numerals, and overlapping descriptions are omitted.

When the image data saving process is selected, the multifunction machine 10 scans the paper document 80 and generates the image data 81 (step S31). The multifunction machine 10 generates the hash value 82 of the image data 81 (step S32), and outputs the generated hash value 82 to the IC chip 108 (step S33). The IC chip 108 encrypts the hash value 82 with a signature key specific to the multifunction machine 10 and generates a machine signature 1203 (step S34). The multifunction machine 10 attaches the machine signature 1203 to the image data 81 and saves the image data 81 in the HDD 107 (step S35 and step S36).

Accordingly, in the image data saving process, the image data is temporarily saved in the HDD 107 of the multifunction machine 10, so that when the user A subsequently has ready another IC card 120 storing a valid public key certificate 1201, a user signature is attached to the saved image data. In this case, the paper document 80 can be scanned while the user A is preparing another IC card 120 storing a valid public key certificate 1201, so that time is not wasted and efficiency is enhanced.

The reason why a machine signature is attached to the image data to be saved (hereinafter, "saved data") is that a malicious party might falsify the saved data before a user signature is attached to the saved data. This problem is particularly critical when the multifunction machine 10 is connected to the Internet. By attaching a machine signature to the saved data until a user signature is attached, it is possible to detect whether the saved data has been falsified. The saved data does not necessarily have to be signed by a signature key specific to the machine; a time stamp can be stamped by an external time stamp service, or another type of electronic signature can be attached, in order to detect falsification.

As described with reference to FIGS. 5 through 7, the multifunction machine 10 according to the present embodiment validates the public key certificate 1201 before performing the scan operation. When the validity of the public key certificate 1201 cannot be confirmed, a user signature is not generated. Thus, it is possible to prevent useless operations of generating an electronic signature with an invalid signature key, and attaching the invalid electronic signature to image data.

Figure 8:
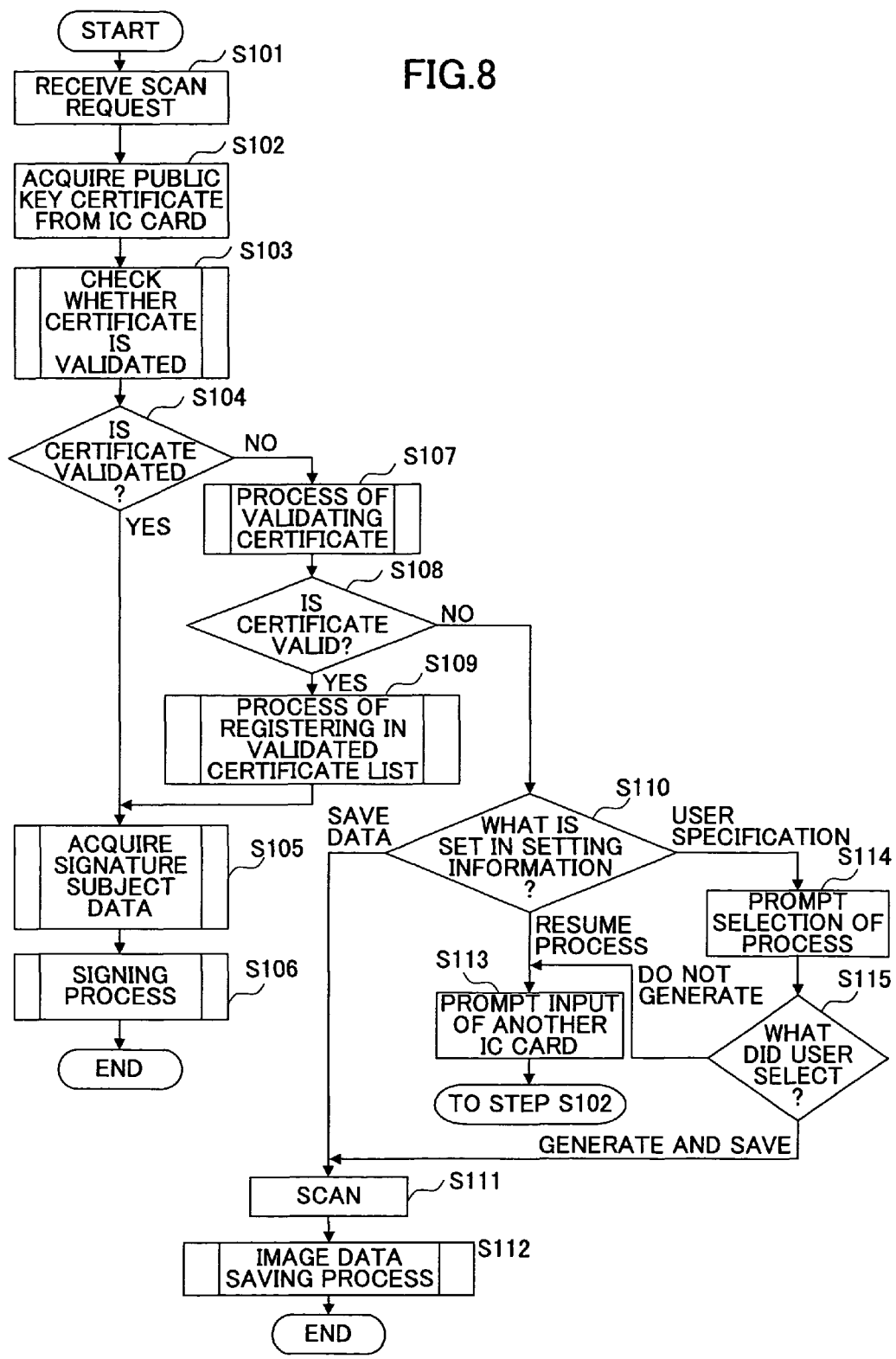
FIG. 8 is a flowchart of a process performed by the multifunction machine when scanning a document.

A more detailed description of the processes performed by the multifunction machine 10 is given below. FIG. 8 is a flowchart of a process performed by the multifunction machine 10 when scanning a document.

In step S101, when a scan request is received from a user, the scan request receiving unit 12 sends a notification to the control unit 11 that a scan request is generated. The control unit 11 acquires the public key certificate 1201 from the certificate storage unit 22 in the IC card 120 (step S102), and determines whether the public key certificate 1201 has already been validated (step S103)

Specifically, the multifunction machine 10 registers a validated public key certificate in a validated certificate list. Accordingly, a redundant process of validating the same public key certificate 1201 is prevented from being executed.

FIG. 9 is a table of an example of a validated certificate list 201. In the validated certificate list 201, a serial number, certificate data, an expiration date, and validation proof information are registered for each validated public key certificate 1201.

Thus, in step S103, the multifunction machine 10 confirms whether the current public key certificate 1201 is registered in the validated certificate list 201. Details of step S103 and the validated certificate list 201 will be described later.

When the public key certificate 1201 has been validated (Yes in step S104), image data to which a user signature is to be attached (hereinafter, "signature subject data") is acquired (for example, by scanning the paper document 80) (step S105). Subsequently, a user signature for the signature subject data is generated (step S106).

Conversely, when the public key certificate 1201 has not been validated (No in step S104), the certificate validating unit 18 validates the public key certificate 1201 (step S107). Details of this process will be described later.

When the certificate validating unit 18 confirms that the public key certificate 1201 is valid in step S107 (step S108), the public key certificate 1201 is registered in the validated certificate list 201 (step S109). Subsequently, signature subject data is acquired (step S105), and a user signature is generated (step S106).

When the certificate validating unit 18 determines that the public key certificate 1201 is invalid in step S107 (No in step S108), it is useless to generate a user signature. Instead, the following processes are performed based on setting information that is previously selected.

When the setting information indicates that the image data is to be saved when the public key certificate 1201 is invalid (save data in step S110), the control unit 11 instructs the image data acquiring unit 15 to scan the paper document 80, and acquires the image data generated in the scanning operation (step S111). Subsequently, the image data saving process described with reference to FIG. 7 is performed (step S112). Details of the process in step S112 will be described later.

When the setting information indicates to resume the process when the public key certificate 1201 is invalid (resume process in step S110), the control unit 11 instructs the display control unit 14 to display a message on the display 101b to prompt the user to insert another IC card 120 (step S113).

FIG. 10 is an example screen message to prompt the user to insert another IC card 120. The message shown in FIG. 10 says "The signature key in your IC card is invalid. Please insert another IC card including a valid signature key".

When the user inserts another IC card 120 in response to this message, the steps from step S102 are repeated.

When the setting information indicates user specification when the public key certificate 1201 is invalid (user specification in step S110), the control unit 11 instructs the display control unit 14 to display a message on the display 101b to prompt the user to select a subsequent process (step S114).

Figure 11:
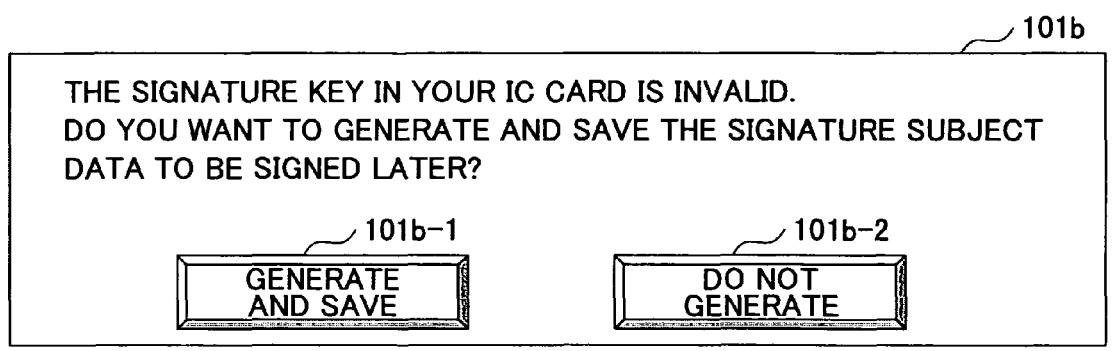
FIG. 11 is an example screen message to prompt a user to select a subsequent process when the public key certificate is invalid.

FIG. 11 is an example screen message to prompt the user to select a subsequent process when the public key certificate 1201 is invalid. In FIG. 11, the message shown on the display 101b says "The signature key in your IC card is invalid. Do you want to generate and save the signature subject data to be signed later?" The display 101b also displays a button 101b-1 and a button 101b-2, to allow the user select whether to generate and save the data.

When the user selects the button 101b-1 ("generate and save" in step S115), the steps from step S111 are performed to scan the paper document 80 and save the image data.

Conversely, when the user selects the button 101b-2 ("do not generate" in step S115), the steps from step S113 are performed to prompt the user to insert another IC card 120.

Figure 12:
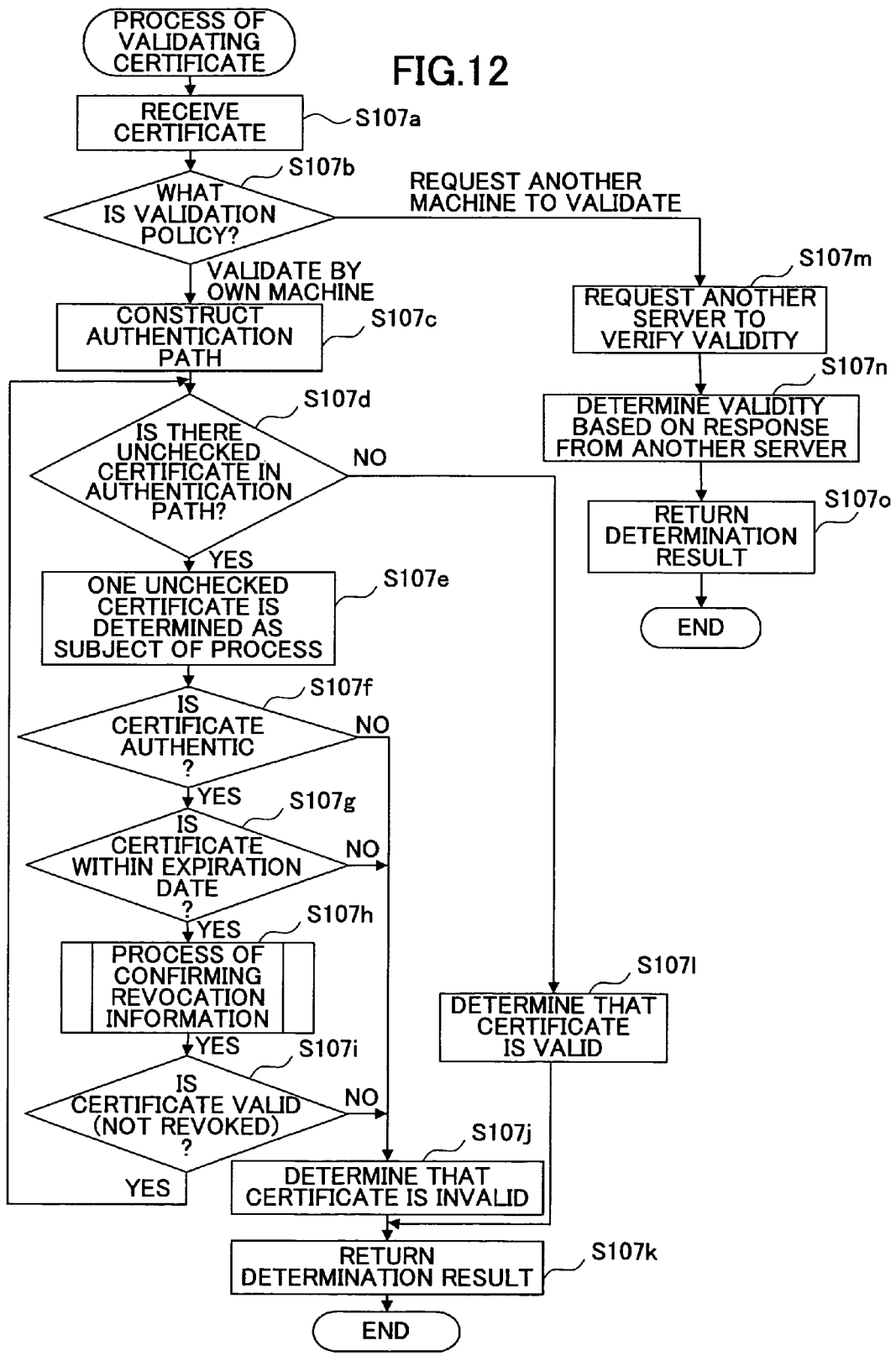
FIG. 12 is a flowchart of a process of validating the public key certificate.

A detailed description of validating the public key certificate 1201 in step S107 is given below. FIG. 12 is a flowchart of a process of validating the public key certificate 1201. Specifically, the public key certificate 1201 is validated by checking the authenticity, the validity period, and the revocation information of the public key certificate 1201. The processes shown in FIG. 12 are performed by the certificate validating unit 18 in response to an instruction received from the control unit 11.

The certificate validating unit 18 receives the public key certificate 1201 from the control unit 11 (step S107a). The process diverges according to a validation policy that is previously set in the multifunction machine 10 by the user (step S107b). The validation policy indicates how to validate the public key certificate 1201. Specifically, the user previously selects whether the public key certificate 1201 is to be validated by the multifunction machine 10 itself or by another machine.

When the validation policy is such that the public key certificate 1201 is to be validated by the multifunction machine 10 itself ("validate by own machine" in step S107b), an authentication path of the public key certificate 1201 is constructed (step S107c). The authentication path is described with reference to FIG. 13.

Figure 13:
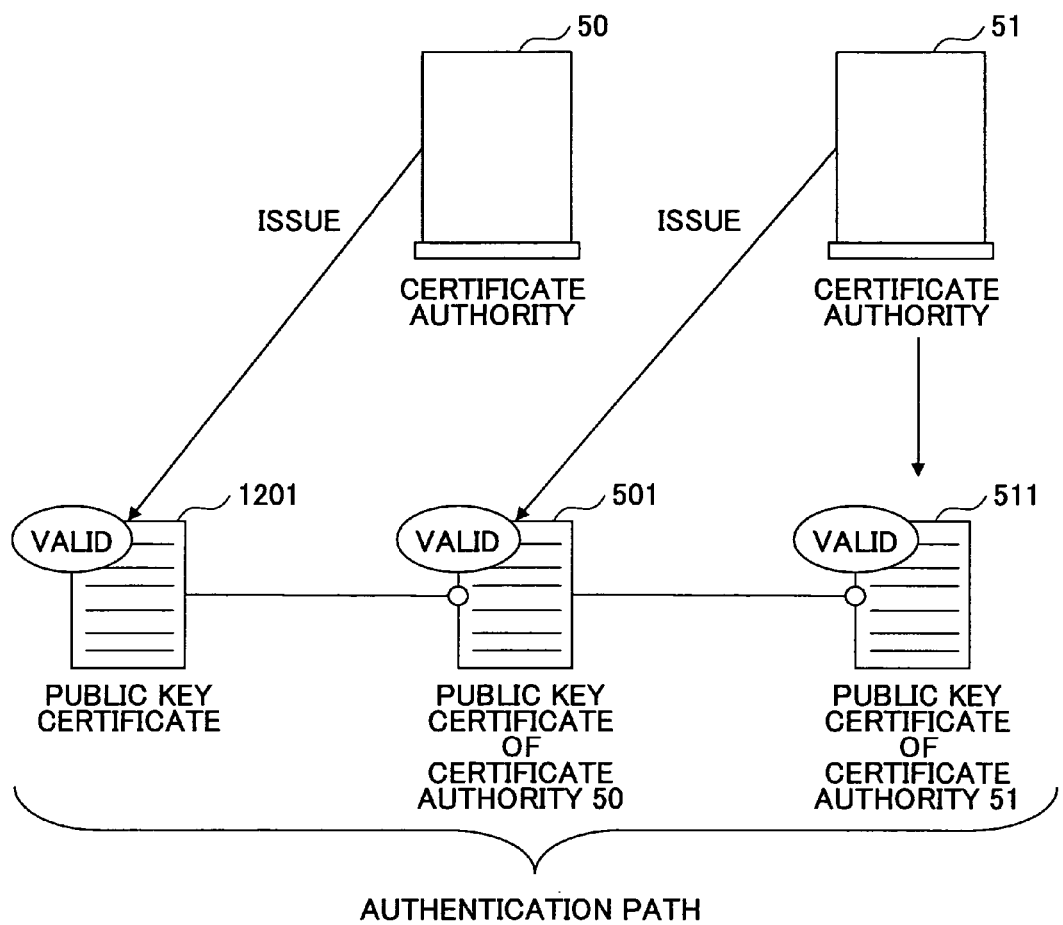
FIG. 13 is a schematic diagram for describing an authentication path of the public key certificate.

FIG. 13 is a schematic diagram for describing the authentication path of the public key certificate 1201. FIG. 13 describes that the public key certificate 1201 stored in the IC card 120 is issued by the certificate authority 50, as described earlier. Furthermore, each certificate authority issues a public key certificate that proves its own validity. Some certificate authorities may have their public key certificates issued by another certificate authority. In FIG. 13, a public key certificate 501 of the certificate authority 50 is issued by another certificate authority 51. A public key certificate 511 of the certificate authority 51 is issued by the certificate authority 51 itself. Each public key certificate records the certificate authority by which it was issued.

In the example shown in FIG. 13, constructing an authentication path of a public key certificate means to recursively acquire a public key certificate of the certificate authority by which a public key certificate is issued. Thus, an authentication path of the public key certificate 1201 is "public key certificate 1201-public key certificate 501-public key certificate 511".

Referring back to FIG. 12, steps from step S107d are performed to validate each public key certificate included in the constructed authentication path (in this example, the public key certificate 1201, the public key certificate 501, and the public key certificate 511).

Among the public key certificates included in the authentication path, a public key certificate that has not been validated (has not been subject to processes from steps S107f to S107h) becomes the subject of process (step S107e). Hereinafter, the public key certificate to be subject to process is referred to as "current certificate".

The certificate validating unit 18 checks authenticity of the current certificate (step S107f). Specifically, the certificate validating unit 18 determines whether the current certificate has been falsified based on an electronic signature attached to the current certificate by the certificate authority that issued the current certificate.

When the authenticity of the current certificate is confirmed, i.e., when the current certificate is not falsified (Yes in step S107f), the certificate validating unit 18 determines whether the current certificate is within the validity period (step S107g). Specifically, the certificate validating unit 18 compares the expiration date recorded in the current certificate with a time and date indicated by the internal clock built into the multifunction machine 10. When the present time has not passed the expiration date, the certificate validating unit 18 determines that the validity period has not expired.

When the validity period of the current certificate has not expired (Yes in step S107g), the certificate validating unit 18 checks revocation information issued by the certificate authority so as to confirm whether the current certificate has been revoked (step S107h). Details of this process will be described later.

When the current certificate is valid (Yes in step S107i), the process returns to step S107d, and the certificate validating unit 18 confirms whether all public key certificates included in the authentication path have been validated. When all public key certificates are validated (No in step S107d), the certificate validating unit 18 determines that the public key certificate 1201 is valid (step S107l). This determination result is returned to the control unit 11, along with the information acquired in step S107h to determine whether the current certificate had been revoked (CRL (Certificate Revocation List) or OCSP (Online Certificate Status Protocol) response) (step S107k).

With regard to any of the public key certificates included in the authentication path, when it is determined as unauthentic (No in step S107f), or the validity period has expired (No in step S107g), or revoked (No in step S107i), the certificate validating unit 18 determines that the public key certificate 1201 is invalid (step S107j). This determination result is returned to the control unit 11, along with the information acquired in step S107h used to determine whether the current certificate had been revoked (CRL or OCSP response) (step S107k).

On the other hand, when the validation policy is such that the public key certificate 1201 is to be validated by another machine ("request another machine to validate" in step S107b), the public key certificate 1201 is sent to a certificate verifying server located at a URI (Uniform Resource Identifier) provided in the validation policy, such as a DVCS (Data Validation and Certification Server Protocols) server or a SCVP (Simple Certificate Validation Protocol) server, and requests the certificate verifying server to verify the public key certificate 1201 (step S107m).

When a response is received from the certificate verifying server, the certificate validating unit 18 validates the public key certificate 1201 based on a verification certificate included in the response (step S107n), and returns the determination result to the control unit 11.

As described above, a public key certificate can be validated by another machine in accordance with the validation policy. Depending on the processing capacity of the multifunction machine 10, and an anticipated surplus of processing capacity in another environment in which the validation is assumed to be performed, the validation process of the public key certificate 1201 can be performed either by the multifunction machine 10 itself or by another external machine. Therefore, the processing capacity of the multifunction machine 10 can be used in an optimal manner. When another machine is assigned to perform the validation process, the workload of the multifunction machine 10 can be reduced.

Figure 14:
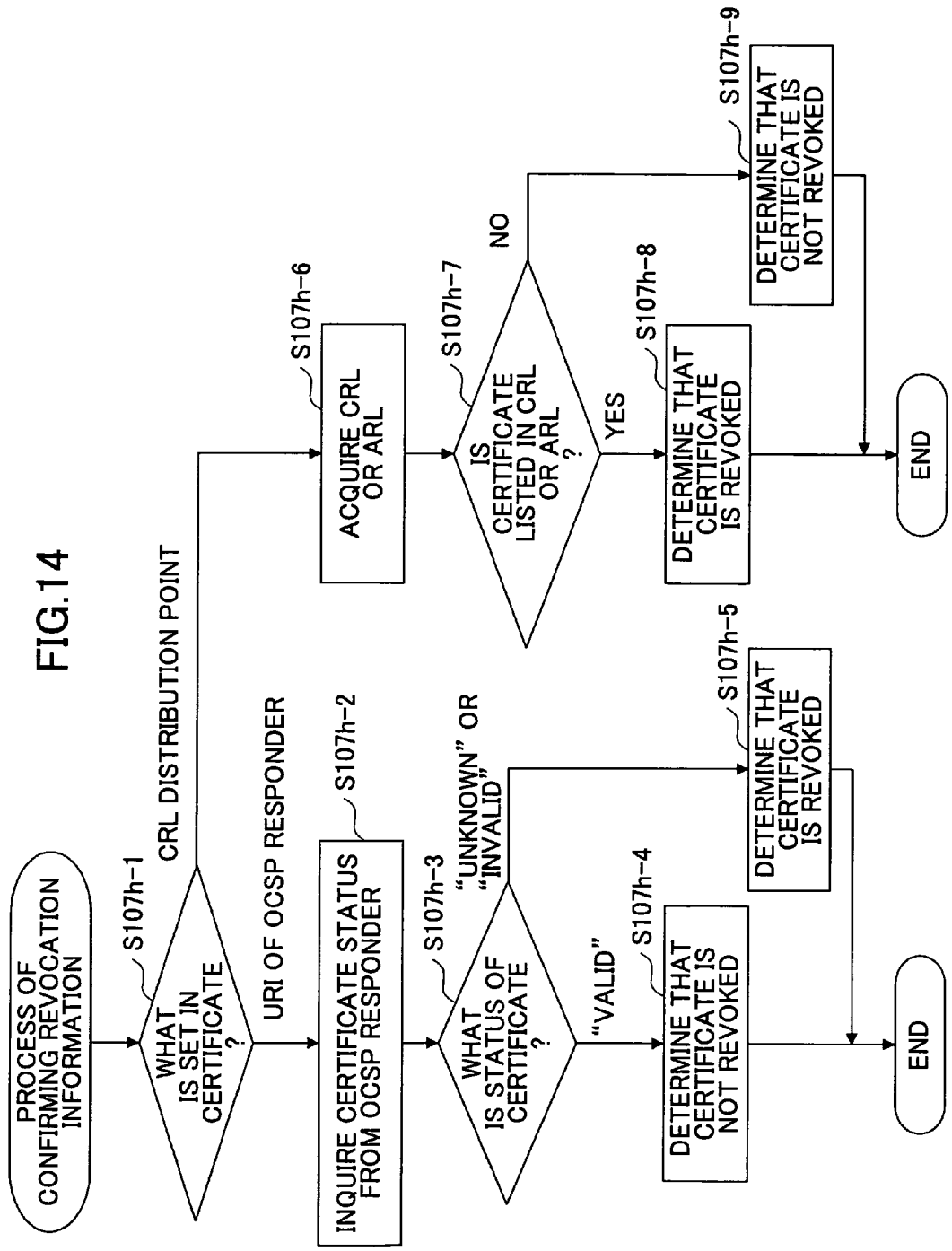
FIG. 14 is a flowchart of a process of confirming revocation information.

Details of the process of confirming the revocation information in step S107h shown in FIG. 12 are described below. FIG. 14 is a flowchart of a process of confirming revocation information. The process of FIG. 14 is performed by the certificate validating unit 18.

The method of confirming revocation information differs according to the public key certificate. A method using a CRL is generally employed. Specifically, a CRL is a list including revoked public key certificates. The CRL is downloaded via the Internet from a server referred to as a CRL distribution point. It is confirmed whether a subject public key certificate is included in the downloaded list.

Another method employs an OCSP responder. In this method, a public key certificate for which revocation information is to be confirmed is sent to a server called an OCSP responder, and the status of the public key certificate is acquired from the OCSP responder. The OCSP responder returns a response indicating whether the status of the public key certificate is "valid", "invalid", or "unknown". The resultant data returned from the OCSP responder is referred to as an OCSP response.

Thus, in step S107h-1 shown in FIG. 14, the certificate validating unit 18 confirms whether a URI of an OCSP responder or a URI of a CRL distribution point is in the current certificate. Accordingly, the revocation information is confirmed either by referring to a CRL or by acquiring the status of the current certificate by an OCSP response.

When a URI of an OCSP responder is in the current certificate, the process proceeds to step S107h-2. The certificate validating unit 18 sends an OCSP request to an OCSP responder to inquire about the status of the current certificate.

When the OCSP response from the OCSP responder indicates that the status of the current certificate is "valid" ("valid" in step S107h-3), the certificate validating unit 18 determines that the current certificate has not been revoked (step S107h-4). When the OCSP response from the OCSP responder indicates that the status of the current certificate is "unknown" or "invalid" ("unknown" or "invalid" in step S107h-3), the certificate validating unit 18 determines that the current certificate has been revoked (step S107h-5).

When a URI of a CRL distribution point is in the current certificate in step S107h-1, the process proceeds to step S107h-6, and a CRL is downloaded from the distribution point. If the current certificate is in the middle or at the root of the authentication path, an ARL (Authority Revocation List) is acquired. An ARL is a revocation list of certificate authorities. The certificate validating unit 18 determines whether the current certificate is listed in the downloaded CRL or ARL (step S107h-7). When either the CRL or the ARL includes the current certificate (Yes in step S107h-7), the certificate validating unit 18 determines that the current certificate has been revoked (step S107h-8). When neither the CRL nor the ARL includes the current certificate (No in step S107h-7), the certificate validating unit 18 determines that the current certificate has not been revoked (step S107h-9).

The process in step S109 shown in FIG. 8 of registering a validated public key certificate 1201 in the validated certificate list 201 is described in detail. This process is performed for the public key certificate 1201 determined as valid as a result of the process described with reference to FIG. 12 and FIG. 14.

Figure 15:
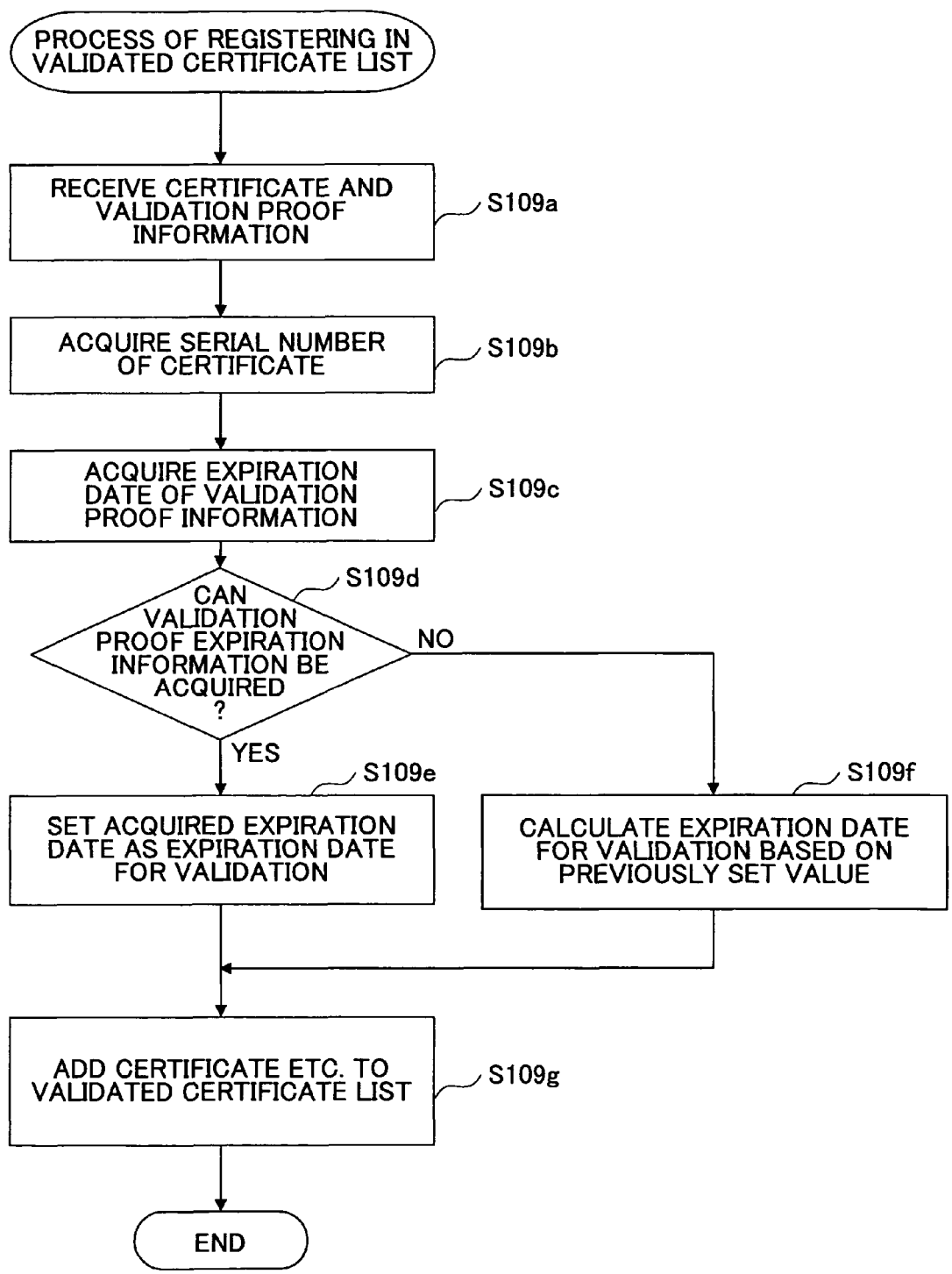
FIG. 15 is a flowchart of a process of registering a validated certificate in the validated certificate list.

FIG. 15 is a flowchart of a process of registering a validated certificate in the validated certificate list 201. The process shown in FIG. 15 is performed by the certificate list storage unit 21 in response to an instruction from the control unit 11.

The certificate list storage unit 21 receives the public key certificate 1201 confirmed as valid and information used for the validation (for example, a CRL, an OCSP response, a verification certificate such as a DVC; hereinafter, "validation proof information") from the control unit 11 (step S109a). The certificate list storage unit 21 acquires a serial number from the public key certificate 1201 (step S109b). Serial numbers that uniquely identify each of the public key certificates 1201 are recorded in the corresponding public key certificates 1201. Such a serial number is acquired in step S109b.

The certificate list storage unit 21 acquires information indicating an expiration date of the acquired validation proof information from the corresponding validation proof information (hereinafter, "validation proof expiration information") (step S109c). Specifically, the validation proof expiration information corresponds to a next update date included in a CRL or an OCSP response, or information corresponding to a next update date included in response data from a DVCS server or an SVCP server. Because a CRL or an OCSP response is periodically updated, a next update date may be included therein.

When validation proof expiration information is included in the validation proof information (Yes in step S109d), an expiration date indicated in the validation proof expiration information is set as an expiration date for validation (i.e., an expiration date in the validated certificate list 201) (step S109e).

When validation proof expiration information is not included in the validation proof information (No in step S109d), the certificate list storage unit 21 calculates an expiration date for validation based on a set value previously set in the multifunction machine 10 (step S109f). A validity period for validation is previously set in the multifunction machine 10 by a user, so that the expiration date for validation can be calculated by adding the set validity period to the present system time.

The serial number of the public key certificate 1201, data of the public key certificate 1201 itself, the expiration date of validation, and validation proof information are added as new entries in the validated certificate list 201 shown in FIG. 9 (step S109g).

Accordingly, when a public key certificate 1201 is validated once, information indicating that the public key certificate 1201 is validated is recorded (cached) in the validated certificate list 201 in the multifunction machine 10.

The process in step S103 shown in FIG. 8 of checking whether the public key certificate 1201 has already been validated is described in detail. This process is performed to determine whether the validation process described with reference to FIG. 12 and FIG. 14 is necessary.

Figure 16:
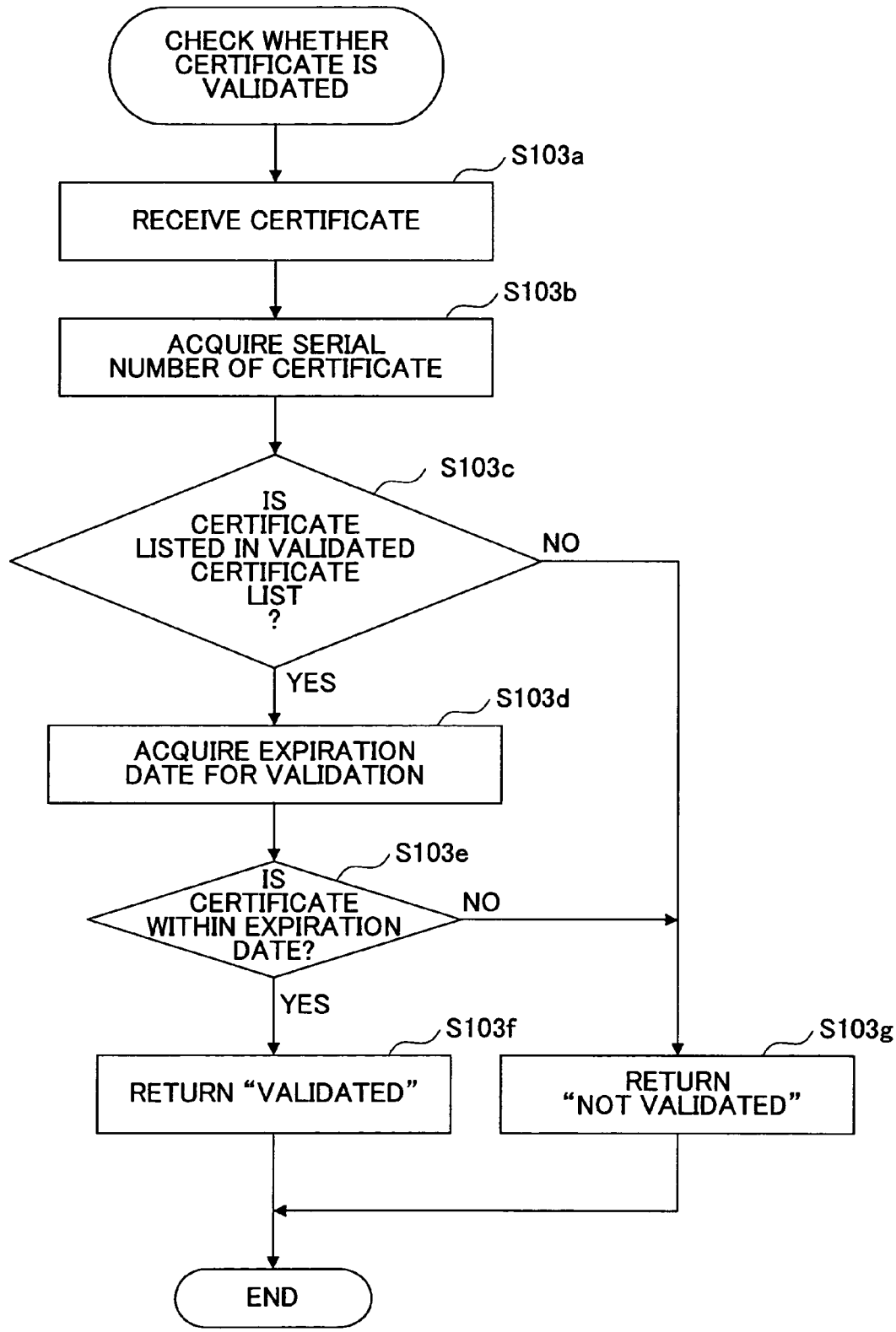
FIG. 16 is a flowchart of a process of checking whether the public key certificate has already been validated.

FIG. 16 is a flowchart of a process of determining whether the public key certificate 1201 has already been validated. The process shown in FIG. 16 is performed by the certificate list storage unit 21 in response to an instruction from the control unit 11.

The certificate list storage unit 21 receives the public key certificate 1201 from the control unit 11 (step S103a). The certificate list storage unit 21 acquires a serial number from the public key certificate 1201 (step S103b), and determines whether the public key certificate 1201 is included in the validated certificate list 201 by using the acquired serial number as a key (step S103c).

When the public key certificate 1201 is included in the validated certificate list 201 (Yes in step S103c), the certificate list storage unit 21 acquires an expiration date for validation (cache) (i.e., an expiration date until which the public key certificate 1201 is listed in the validated certificate list 201) (step S103d), and compares the expiration date with a system time of the multifunction machine 10, to determine whether the cache has expired (step S103e). When the cache has not expired (Yes in step S103e), the certificate list storage unit 21 returns a message to the control unit 11 that the public key certificate 1201 has been validated (step S103f).

When the public key certificate 1201 is not included in the validated certificate list 201 (No in step S103c), or the public key certificate 1201 is included in the validated certificate list 201 but the cache has expired (No in step S103e), the certificate list storage unit 21 returns a message to the control unit 11 that the public key certificate 1201 has not been validated (step S103g). Specifically, even if the public key certificate 1201 has been validated in the past, the public key certificate 1201 may have been revoked since then. Thus, when the cache has expired, the certificate list storage unit 21 returns a message to the control unit 11 that the public key certificate 1201 has not been validated, so that the validation process described with reference to FIG. 12 and FIG. 14 is performed once again.

Figure 17:
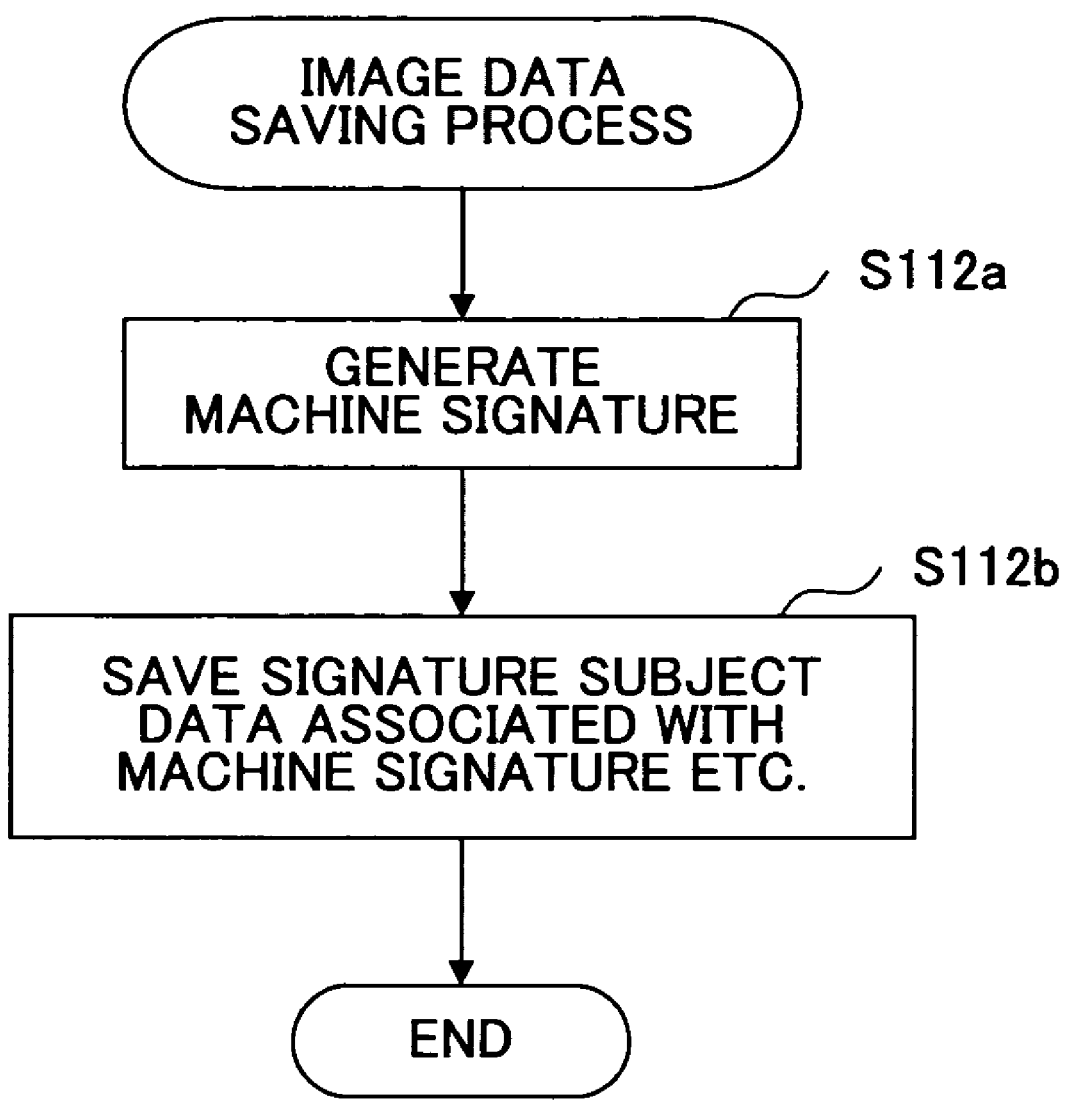
FIG. 17 is a flowchart of a process of saving image data.

The process in step S112 shown in FIG. 8 of saving image data is described in detail. FIG. 17 is a flowchart of a process of saving image data.

When the computing unit 17 in the IC chip 108 receives scanned image data from the control unit 11, the computing unit 17 generates the machine signature 1203 (step S112a). When the control unit 11 receives the machine signature 1203 from the computing unit 17, the control unit 11 instructs the image data storage unit 20 to save the image data and the machine signature 1203. The image data storage unit 20 saves the image data, the machine signature 1203, the time of saving, and information briefly describing contents of the image data (document title, thumbnail image, etc.), associated with each other in the HDD 107 (step S112b).

Figure 18:
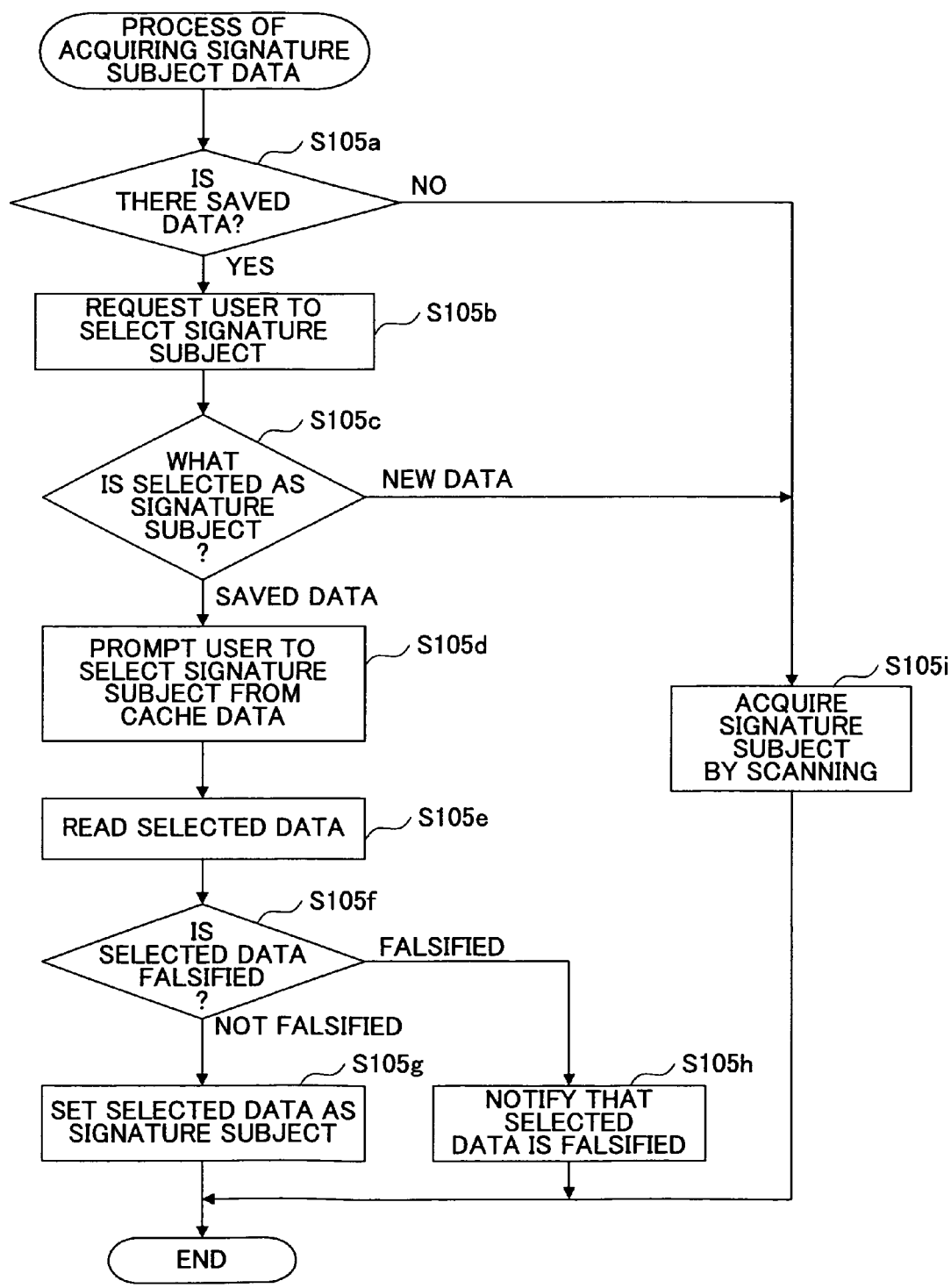
FIG. 18 is a flowchart of a process of acquiring signature subject data.

The process in step S105 shown in FIG. 8 of acquiring the signature subject data is described in detail. FIG. 18 is a flowchart of a process of acquiring the signature subject data.

The control unit 11 confirms whether the image data storage unit 20 includes saved data (image data saved without a user signature) (step S105a). When the image data storage unit 20 includes saved data (Yes in step S105a), the display control unit 14 displays a message on the display 101b to prompt a user to select either to acquire the signature subject data from the saved data, or generate (scan) new signature subject data (step S105b).

Figure 19:
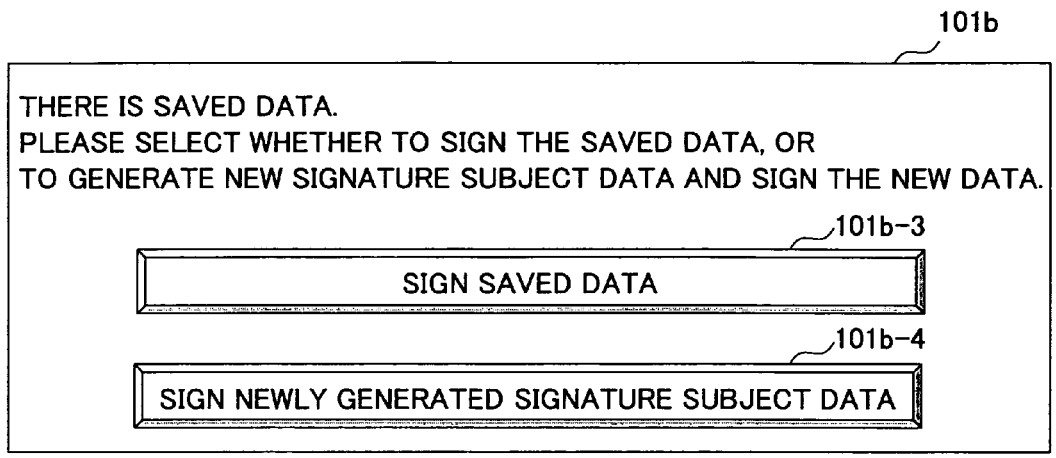
FIG. 19 is an example screen message to prompt a user to make a selection as to where to acquire the signature subject data.

FIG. 19 is an example screen message to prompt a user to select where to acquire the signature subject data. In FIG. 19, the message displayed on the display 101b says "There is saved data. Please select whether to sign the saved data, or to generate new signature subject data and sign the new data."

The display 101b also displays a button 101b-3 and a button 101b-4, to allow the user to select the signature subject data.

When the user selects the button 101b-3 ("saved data" in step S105c), the display control unit 14 displays a message on the display 101b to prompt the user to select the signature subject data from saved data accumulated in the image data storage unit 20 (step S105d).

Figure 20:
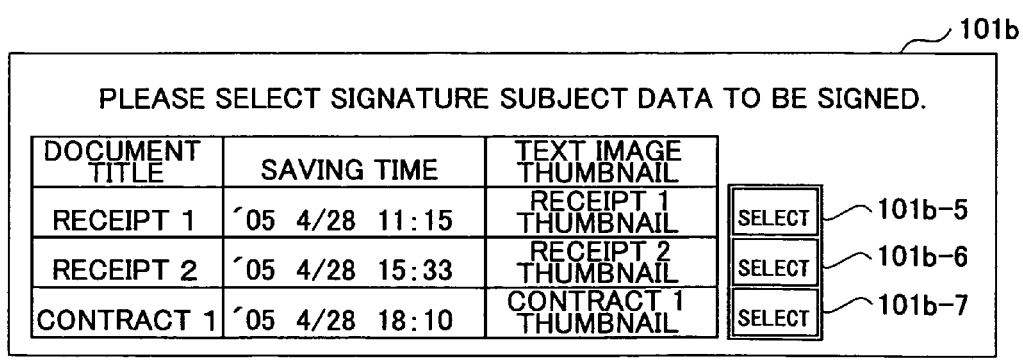
FIG. 20 is an example screen message to prompt a user to select the signature subject data.

FIG. 20 is an example screen message to prompt a user to select the signature subject data. In FIG. 20, the display 101b is displaying a list of saved data and selection buttons 101b-5 to 101b-7 for allowing a user select any one of the saved data items as the signature subject data.

When the user selects any one of the selection buttons 101b-5 to 101b-7, the display control unit 14 notifies the control unit 11 of the selection.

The control unit 11 reads the selected saved data (hereinafter, "selected data") stored in the image data storage unit 20 (step S105e). After reading the selected data, the control unit 11 deletes the selected data from the image data storage unit 20. The control unit 11 confirms whether the selected data has been falsified based on the machine signature 1203 attached to the selected data (step S105f).

When the selected data is not falsified (not falsified in step S105f), the control unit 11 designates the selected data as the signature subject data (step S105g). When the selected data is falsified (falsified in step S105f), the control unit 11 determines that the selected data is unusable, and instructs the display control unit 14 to display a message reporting that the selected data has been falsified (step S105h).

When there is no saved data accumulated in the image data storage unit 20 (No in step S105a), or when the button 101b-4 is selected at the message shown in FIG. 19 ("new data" in step S105c), the control unit 11 instructs the image data acquiring unit 15 to scan the paper document 80, and designates the image data generated by the scanning operation as the signature subject data (step S105i).

Figure 21:
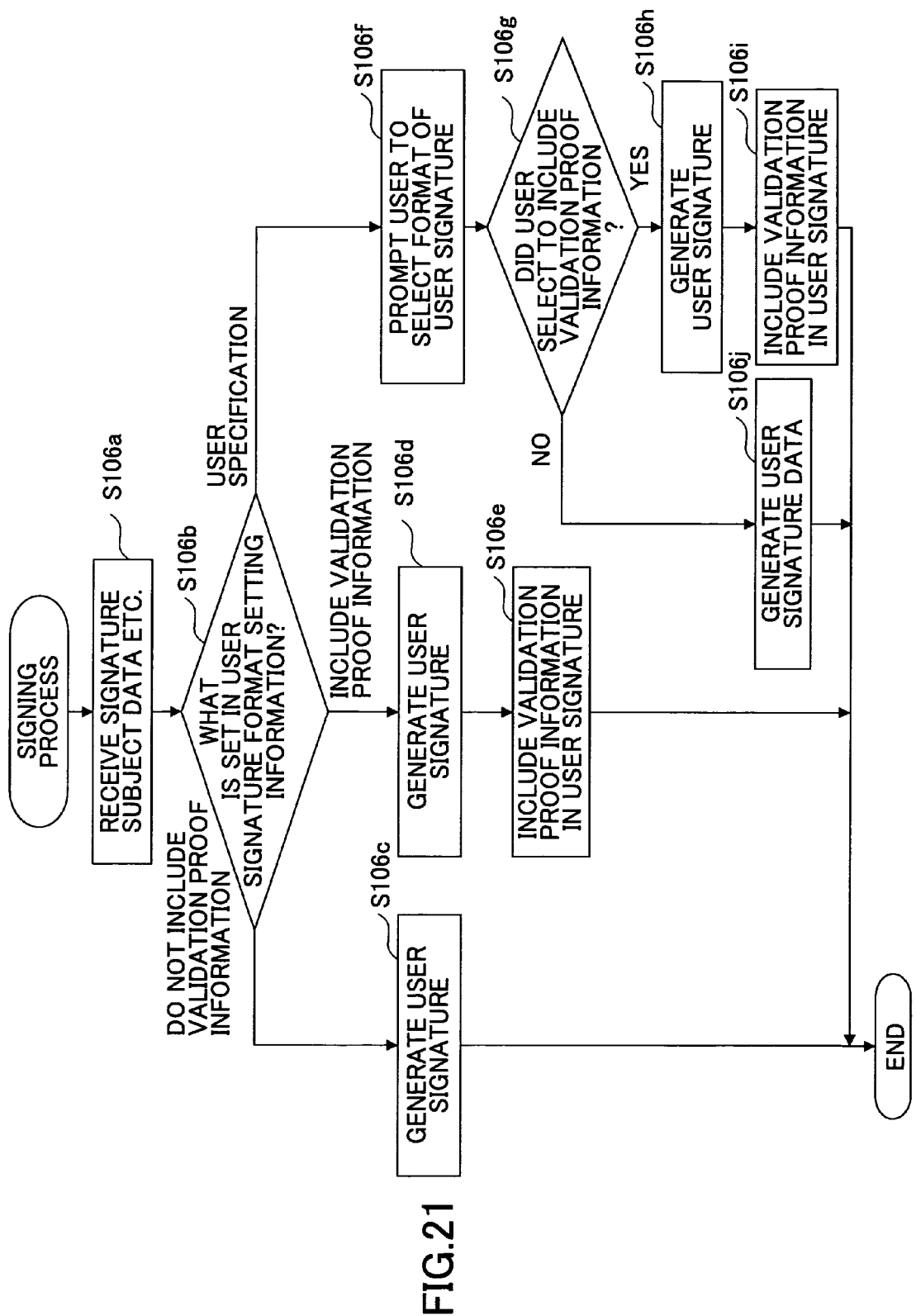
FIG. 21 is a flowchart of a process of generating a signature.

The process in step S106 shown in FIG. 8 of generating a signature is described in detail. FIG. 21 is a flowchart of a process of generating a signature. The process shown in FIG. 21 is performed by the computing unit 23 of the IC card 120 that is presented to the IC card reader 102 of the multifunction machine 10 in response to an instruction from the control unit 11.

The computing unit 23 receives, from the control unit 11, signature subject data, validation proof information, user signature format setting information, and an instruction to generate a user signature (step S106a). The user signature format setting information is information about the format of the user signature 1202, which is previously provided by a user and saved in, for example, the HDD 107.

The process diverges according to the contents of the user signature format setting information (step S106b). When the user signature format setting information indicates not to include validation proof information in the user signature 1202 (do not include validation proof information in step S106b), the process proceeds to step S106c where the computing unit 23 generates the user signature 1202, and outputs the generated user signature 1202 to the control unit 11.

When the user signature format setting information indicates to include validation proof information in the user signature 1202 (include validation proof information in step S106b), the process proceeds to step S106d where the computing unit 23 generates the user signature 1202. Further, the validation proof information is included in the generated user signature 1202, and the user signature 1202 is output to the control unit 11 (step S106e).

By including the validation proof information in the user signature 1202, there is no need to validate the public key certificate 1201 at the time of verifying the user signature 1202. As long as the validation proof information is safely saved, the public key certificate 1201 can be validated at any time (this solves the problem of a certificate authority deleting, from a certificate revocation list, a certificate corresponding to a signature key used for generating a user signature when the user signature expires).

Further, when the user signature format setting information indicates that a user is to select a format of the user signature 1202 (user specification in step S106b), the control unit 11 instructs the display control unit 14 to display a message on the display 101b to prompt the user to select a format of the user signature (step S106f).

Figure 22:
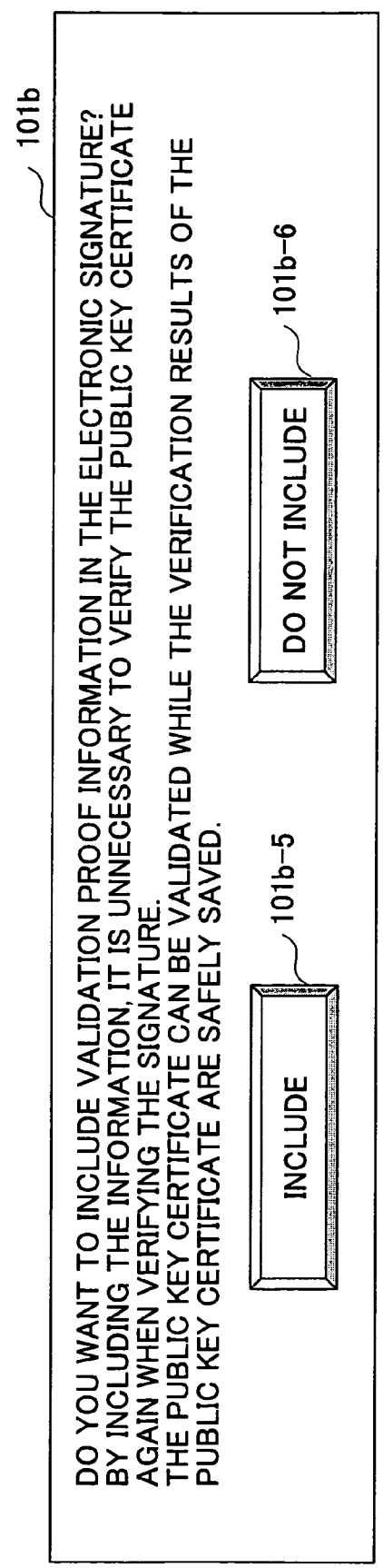
FIG. 22 is an example screen message to prompt a user to select a format of a user signature.

FIG. 22 is an example screen message to prompt the user to select a format of the user signature. In FIG. 22, the message displayed on the display 101b says "Do you want to include validation proof information in the electronic signature? By including the information, it is unnecessary to verify the public key certificate again when verifying the signature. The public key certificate can be validated while the verification results of the public key certificate are safely saved. The display 101b also displays a button 101b-5 and a button 101b-6, to allow the user to select whether to include the validation proof information in the electronic signature.

When the user selects the button 101b-5 (Yes in step S106g), the computing unit 23 generates a user signature (step S106h), includes the validation proof information in the user signature, and outputs the user signature including the validation proof information to the control unit 11 (step S106i).

When the user selects the button 101b-6 (No in step S106g), the computing unit 23 generates the user signature, and outputs the user signature to the control unit 11 (step S106j).

The multifunction machine 10 according to one embodiment of the present invention confirms whether the public key certificate 1201 is valid. When the public key certificate 1201 is invalid, a user signature is not generated. Thus, it is possible to prevent a useless operation of generating an electronic signature with a signature key corresponding to an invalid public key certificate.

Further, according to the multifunction machine 10 according to one embodiment of the present invention, when the public key certificate is invalid, a process is controlled based on previously provided information. Thus, the process is flexibly performed depending on the validity of the public key certificate.

The present embodiment describes a user signature as an example of the electronic signature to be attached to image data when the image data is scanned. However, the electronic signature is not limited to a user signature. The process described in the present embodiment may be executed for a machine signature or any other electronic signature to be attached to image data according to operational practices.

The present invention is not limited to the specifically disclosed embodiment, and variations and modifications may be made without departing from the scope of the present invention.

The present application is based on Japanese Priority Patent Application No. 2005-205792, filed on Jul. 14, 2005, the entire contents of which are hereby incorporated by reference.

What is claimed is:

1. An image forming apparatus for attaching an electronic signature to image data read from a paper document, comprising a processing unit and a non-transitory storage medium tangibly embodying instructions executable by the processing unit to configure the processing unit to operate as:

a first generating unit that generates a first electronic signature for the image data by using a first signature key certified by a first public key certificate; and a determining unit that that determines validity of the first public key certificate;

a receiving unit that receives input of a second signature key and a second public key certificate, which are different from the first signature key and the first public key certificate, the second signature key being certified by the second public key certificate, in response to an event that the determining unit determines that the first public key certificate is invalid, wherein the determining unit determines validity of the second public key certificate, and the first generating unit generates a second electronic signature for the image data by using the second signature key, in response to an event that the determining unit determines that the second public key certificate is valid; and a second generating unit that generates a third electronic signature for the image data to be saved in a non-transitory predetermined recording medium, wherein in response to an event that the determining unit determines that the first public key certificate is invalid, (i) the first generating unit is prevented from generating the first electronic signature, (ii) the image data is saved in the predetermined recording medium and (iii) a user is provided with an option to sign later.

2. The image forming apparatus according to claim 1, further comprising:

a reading unit configured to read the paper document to create the image data; wherein the reading unit is prevented from reading the paper document in response to an event that the determining unit determines that the first public key certificate is invalid.

3. The image forming apparatus according to claim 1, wherein the second generating unit generates the third electronic signature by using a third signature key that is specific to the image forming apparatus and stored in the image forming apparatus 4. The image forming apparatus according to claim 1, wherein the first signature key, which is specific to a user, is stored in an IC card.

5. The image forming apparatus according to claim 1, wherein the determining unit determines the validity of the first public key certificate by querying, via a network, a certificate authority that issued the first public key certificate.

6. The image forming apparatus according to claim 5, wherein the determining unit generates an authentication path for the first public key certificate, and determines that the first public key certificate is valid when all public key certificates in the authentication path are valid.

7. The image forming apparatus according to claim 5, further comprising:

a saving unit configured to save a determination result of the determining unit; wherein the determining unit is prevented from querying the certificate authority in response to an event that the determination result saved in the saving unit indicates that the first public key certificate is valid.

8. The image forming apparatus according to claim 7, wherein the saving unit saves the determination result of the determining unit with a period of validity of the determination result.

9. The image forming apparatus according to claim 1, wherein the determining unit requests another machine, which is connected to the image forming apparatus via a network, to determine the validity of the first public key certificate.

10. A method of attaching an electronic signature to image data read from a paper document in an image forming apparatus, the method comprising the steps of:

(a) determining validity of a first public key certificate that certifies a first signature key; and (b) generating a first electronic signature for the image data by using the first signature key;

(c) receiving input of a second signature key and a second public key certificate, which are different from the first signature key and the first public key certificate, the second signature key being certified by the second public key certificate, in response to an event that it is determined in (a) that the first public key certificate is invalid; and (d) determining validity of the second public key certificate;

(e) generating a second electronic signature for the image data by using the second signature key, in response to an event that it is determined in (d) that the second public key certificate is valid; and (f) generating a third electronic signature for the image data to be saved in a non-transitory predetermined recording medium, wherein in response to an event that the first public key certificate is determined in (a) as invalid, (i) the first electronic signature is prevented from being generated in (b), (ii) the image data is saved in the predetermined recording medium and (iii) a user is provided with an option to sign later.

11. A non-transitory computer-readable recording medium tangibly embodying a program product including instructions executable by a computer to perform a procedure for attaching an electronic signature to image data read from a paper document in an image forming apparatus, the procedure comprising the steps of:

(a) determining validity of a first public key certificate that certifies a first signature key; and (b) generating a first electronic signature for the image data by using the first signature key;

(c) receiving input of a second signature key and a second public key certificate, which are different from the first signature key and the first public key certificate, the second signature key being certified by the second public key certificate, in response to an event that it is determined in (a) that the first public key certificate is invalid; and (d) determining validity of the second public key certificate;

(e) generating a second electronic signature for the image data by using the second signature key, in response to an event that it is determined in (d) that the second public key certificate is valid; and (f) generating a third electronic signature for the image data to be saved in a non-transitory predetermined recording medium, wherein in response to an event that the first public key certificate is determined in (a) as invalid, (i) the first electronic signature is prevented from being generated in (b), (ii) the image data is saved in the predetermined recording medium and (iii) a user is provided with an option to sign later.

12. The image forming apparatus according to claim 1, wherein when the determining unit determines that the first public key certificate is valid, and when the saved image data exists, signature subject data is acquired from the saved image data.

* * * * *